US011900892B2

(12) United States Patent
Lin et al.

(10) Patent No.: US 11,900,892 B2
(45) Date of Patent: Feb. 13, 2024

(54) METHODS FOR ACHIEVING COLOR STATES OF LESSER-CHARGED PARTICLES IN ELECTROPHORETIC MEDIUM INCLUDING AT LEAST FOUR TYPES OF PARTICLES

(71) Applicant: E INK CORPORATION, Billerica, MA (US)

(72) Inventors: Craig Lin, Fremont, CA (US); Feng-Shou Lin, Tainan (TW)

(73) Assignee: E INK CORPORATION, Billerica, MA (US)

( * ) Notice: Subject to any disclaimer, the term of this patent is extended or adjusted under 35 U.S.C. 154(b) by 0 days.

(21) Appl. No.: 18/319,070

(22) Filed: May 17, 2023

(65) Prior Publication Data

US 2023/0290316 A1 Sep. 14, 2023

Related U.S. Application Data

(63) Continuation of application No. 17/822,932, filed on Aug. 29, 2022, now Pat. No. 11,694,644, which is a (Continued)

(51) Int. Cl.
*G09G 3/34* (2006.01)

(52) U.S. Cl.
CPC ....... *G09G 3/344* (2013.01); *G09G 2310/065* (2013.01); *G09G 2310/068* (2013.01); *G09G 2320/0242* (2013.01)

(58) Field of Classification Search
CPC ............. G09G 3/344; G09G 2310/065; G09G 2310/068; G09G 2320/0242
See application file for complete search history.

(56) References Cited

U.S. PATENT DOCUMENTS

| | | |
|---|---|---|
| 4,041,481 A | 8/1977 | Sato |
| 6,930,818 B1 | 8/2005 | Liang et al. |

(Continued)

FOREIGN PATENT DOCUMENTS

| | | |
|---|---|---|
| CN | 110010080 A | 7/2019 |
| CN | 112017599 A | 12/2020 |

OTHER PUBLICATIONS

Hertel, Dirk, "Optical measurement standards for reflective e-paper to predict colors displayed in ambient illumination environments," Color Res Appl, 2018;1-15. 2018.

(Continued)

*Primary Examiner* — Michael J Jansen, II
(74) *Attorney, Agent, or Firm* — Rajesh Vallabh

(57) ABSTRACT

Methods for driving an electrophoretic medium including two pairs of oppositely charged particles. The first pair including a first type of positive particles and a first type of negative particles and the second pair consists of a second type of positive particles and a second type of negative particles, wherein the first pair of particles and the second pair of particles have different charge magnitudes (identifiable as zeta potentials). In particular, the driving methods produce cleaner optical stakes of the lesser-charged particles with less contamination from the other particles and more consistent electro-optical performance when the intermediate driving voltages are modified.

19 Claims, 36 Drawing Sheets

Related U.S. Application Data continuation of application No. 17/337,628, filed on Jun. 3, 2021, now Pat. No. 11,462,182.

(60) Provisional application No. 63/035,088, filed on Jun. 5, 2020.

(56) References Cited

U.S. PATENT DOCUMENTS

| | | | | |
|---|---|---|---|---|
| 7,046,228 | B2 | 5/2006 | Liang et al. | |
| 7,230,604 | B2 | 6/2007 | Machida et al. | |
| 7,652,656 | B2 | 1/2010 | Chopra et al. | |
| 7,701,436 | B2 | 4/2010 | Miyasaka | |
| 7,804,483 | B2 | 9/2010 | Zhou et al. | |
| 8,354,994 | B2 | 1/2013 | Sato | |
| 8,576,163 | B2 | 11/2013 | Miyazaki et al. | |
| 8,687,265 | B2 | 4/2014 | Ahn et al. | |
| 9,170,468 | B2 | 10/2015 | Lin et al. | |
| 9,383,623 | B2 | 7/2016 | Lin et al. | |
| 9,501,981 | B2 | 11/2016 | Lin et al. | |
| 9,640,119 | B2 | 5/2017 | Lin et al. | |
| 9,646,547 | B2 | 5/2017 | Lin et al. | |
| 9,761,181 | B2 | 9/2017 | Chan et al. | |
| 9,812,073 | B2 | 11/2017 | Lin et al. | |
| 9,921,451 | B2 | 3/2018 | Telfer et al. | |
| 10,032,419 | B2 | 7/2018 | Lin et al. | |
| 10,147,366 | B2 | 12/2018 | Lin et al. | |
| 10,339,876 | B2 | 7/2019 | Lin et al. | |
| 10,380,931 | B2 | 8/2019 | Lin et al. | |
| 10,380,955 | B2 | 8/2019 | Lin | |
| 10,586,499 | B2 | 3/2020 | Lin et al. | |
| 10,591,800 | B2 | 3/2020 | Chiu et al. | |
| 10,679,571 | B2 | 6/2020 | Chiu et al. | |
| 10,726,760 | B2 | 7/2020 | Lin et al. | |
| 10,891,907 | B2 * | 1/2021 | Lin | G09G 3/344 |
| 11,062,663 | B2 | 7/2021 | Chen et al. | |
| 11,151,951 | B2 | 10/2021 | Lin et al. | |
| 11,500,261 | B2 * | 11/2022 | Wu | G02F 1/167 |
| 2002/0033784 | A1 * | 3/2002 | Machida | G02F 1/167<br>345/84 |
| 2003/0034950 | A1 * | 2/2003 | Liang | G02F 1/1679<br>345/107 |
| 2006/0077190 | A1 | 4/2006 | Zhou et al. | |
| 2006/0139309 | A1 * | 6/2006 | Miyasaka | G09G 3/344<br>345/107 |
| 2006/0146008 | A1 | 7/2006 | Johnson et al. | |
| 2007/0052648 | A1 | 3/2007 | Zhou et al. | |
| 2007/0070028 | A1 | 3/2007 | Zhou et al. | |
| 2007/0132687 | A1 | 6/2007 | Johnson | |
| 2007/0176889 | A1 | 8/2007 | Zhou et al. | |
| 2007/0205978 | A1 * | 9/2007 | Zhou | G09G 3/344<br>345/107 |
| 2007/0206262 | A1 | 9/2007 | Zhou | |
| 2007/0268244 | A1 * | 11/2007 | Chopra | G09G 3/344<br>345/107 |
| 2008/0062159 | A1 | 3/2008 | Roh et al. | |
| 2008/0094315 | A1 | 4/2008 | Johnson et al. | |
| 2008/0224989 | A1 | 9/2008 | Zhou et al. | |
| 2008/0278436 | A1 * | 11/2008 | Sato | G02F 1/167<br>345/107 |
| 2009/0015545 | A1 | 1/2009 | Kato et al. | |
| 2009/0167754 | A1 | 7/2009 | Hatta | |
| 2009/0189849 | A1 * | 7/2009 | Miyazaki | G09G 3/344<br>345/107 |
| 2012/0154899 | A1 * | 6/2012 | Ahn | G09G 3/344<br>359/296 |
| 2014/0340734 | A1 * | 11/2014 | Lin | G02F 1/13306<br>359/296 |
| 2014/0340735 | A1 * | 11/2014 | Lin | G02F 1/1685<br>359/296 |
| 2015/0097877 | A1 * | 4/2015 | Lin | G09G 3/344<br>345/107 |
| 2016/0041448 | A1 * | 2/2016 | Lin | G02F 1/167<br>359/296 |
| 2016/0085132 | A1 * | 3/2016 | Telfer | G09G 3/2003<br>359/296 |
| 2016/0140909 | A1 * | 5/2016 | Lin | G09G 3/344<br>345/107 |
| 2016/0293111 | A1 * | 10/2016 | Lin | G09G 3/344 |
| 2017/0025072 | A1 * | 1/2017 | Lin | G09G 3/2003 |
| 2017/0148395 | A1 * | 5/2017 | Chan | G02F 1/13306 |
| 2017/0263176 | A1 * | 9/2017 | Lin | G09G 3/2003 |
| 2018/0122306 | A1 * | 5/2018 | Lin | G02F 1/1685 |
| 2018/0240412 | A1 * | 8/2018 | Chiu | G09G 3/344 |
| 2019/0212626 | A1 * | 7/2019 | Chiu | G02F 1/1685 |
| 2019/0213959 | A1 * | 7/2019 | Lin | G02F 1/167 |
| 2019/0325804 | A1 * | 10/2019 | Lin | G02F 1/1685 |
| 2020/0175929 | A1 * | 6/2020 | Chen | G02F 1/1685 |
| 2020/0184906 | A1 | 6/2020 | Lin et al. | |
| 2020/0379312 | A1 | 12/2020 | Wu et al. | |

OTHER PUBLICATIONS

Korean Intellectual Property Office, "International Search Report and Written Opinion", PCT/US2021/035635, dated Sep. 13, 2021. Sep. 13, 2021.

* cited by examiner

METHODS FOR ACHIEVING COLOR STATES OF LESSER-CHARGED PARTICLES IN ELECTROPHORETIC MEDIUM INCLUDING AT LEAST FOUR TYPES OF PARTICLES

RELATED APPLICATIONS

This application is a continuation of U.S. patent application Ser. No. 17/822,932, filed on Aug. 29, 2022, which is a continuation of U.S. patent application Ser. No. 17/337,628, filed on Jun. 3, 2021, which claims priority to U.S. Provisional Patent Application No. 63/035,088, filed Jun. 5, 2020, all of which applications are incorporated by reference in their entireties. All patents and publications disclosed herein are also incorporated by reference in their entireties.

FIELD OF THE INVENTION

The present invention is directed to driving methods for a color display device including an electrophoretic medium with at least four different particle sets, each particle set having a charge polarity and a charge magnitude and none of the particle sets having the same charge polarity and charge magnitude. Using the methods described herein, each pixel can display high-quality color states of lesser-charged particles.

BACKGROUND

In order to achieve a color display, color filters are often used. The most common approach is to add color filters on top of black/white sub-pixels of a pixelated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Even with this approach, the white level is normally substantially less than half of that of a black and white display, rendering it an unacceptable choice for display devices, such as e-readers or displays that need well readable black-white brightness and contrast.

SUMMARY

A first aspect of the present invention is directed to a driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein (a) the four types of pigment particles have different optical characteristics;

(b) the first type of particles and the third type of particles are positively charged, wherein the first type of particles have a greater magnitude of positive charge than the third particles; and (c) the second type of particles and the fourth type of particles are negatively charged, wherein the second type of particles have a greater magnitude of negative charge than the fourth particles, the method comprises the steps of:

(i) applying a first driving voltage to the pixel of the electrophoretic display for a first period of time at a first amplitude to drive the pixel to a color state of the first or the second type of particles at the viewing side;

(ii) applying a second driving voltage to the pixel of the electrophoretic display for a second period of time, wherein the second driving voltage has a polarity opposite to that of the first driving voltage and a second amplitude smaller than that of the first amplitude, to drive the pixel from the color state of the first type of particles towards the color state of the fourth type of particles, or from the color state of the second type of particle towards the color state of the third type of particles, at the viewing side, and repeating steps (i)-(ii);

(iii) applying no driving voltage to the pixel for a third period of time;

(iv) applying the second driving voltage to the pixel of the electrophoretic display for a fourth period of time, to drive the pixel from the color state of the first type of particles towards the color state of the fourth type of particles, or from the color state of the second type of particle towards the color state of the third type of particles, at the viewing side, and repeating steps (iii)-(iv) wherein no driving voltage having the same polarity as the first driving voltage is applied between steps (iii) and (iv).

In some embodiments, the second period of time in step (ii) is longer than the first period of time in step (i). In some embodiments, steps (i) and (ii) are repeated at least 8 times. In some embodiments, steps (iii) and (iv) are repeated at least 8 times. In some embodiments, the amplitude of the second driving voltage is less than 50% of the amplitude of the first driving voltage. In some embodiments, the magnitude of the positive charge of the third particle is less than 50% of the magnitude of the positive charge of the first particle. In some embodiments, the magnitude of the negative charge of the fourth particle is less than 75% of the magnitude of the negative charge of the second particle. In some embodiments, a voltage with a shaking waveform is applied to the pixel before step (i). In some embodiments, the fourth period of time in step (iv) is shorter than the second period of time in step (ii). In some embodiments, a third driving voltage is applied to the pixel of the electrophoretic display for a fifth period of time between steps (ii) and (iii), wherein the third driving voltage has the same polarity as the second driving voltage, and the same magnitude as the first amplitude.

A second aspect of the present invention is directed to a driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein (a) the four types of pigment particles have different optical characteristics;

(b) the first type of particles and the third type of particles are positively charged, wherein the first type of particles have a greater magnitude of positive charge than the third particles; and (c) the second type of particles and the fourth type of particles are negatively charged, wherein the second type of particles have a greater magnitude of negative charge than the fourth particles, the method comprises the steps of:

(i) applying a first driving voltage to the pixel of the electrophoretic display for a first period of time at a first amplitude to drive the pixel to a color state of the first or the second type of particles at the viewing side;

(ii) applying a second driving voltage to the pixel of the electrophoretic display for a second period of time, wherein the second driving voltage has a polarity opposite to that of the first driving voltage and a second amplitude smaller than that of the first amplitude, to drive the pixel from the color state of the first type of particles towards the color state of the fourth type of particles, or from the color state of the second type of particle towards the color state of the third type of particles, at the viewing side;

(iii) applying no driving voltage to the pixel for a third period of time, and repeating steps (i)-(iii);

(iv) applying no driving voltage to the pixel for a fourth period of time;

(v) applying the second driving voltage to the pixel of the electrophoretic display for a fifth period of time, to drive the pixel from the color state of the first type of particles towards the color state of the fourth type of particles, or from the color state of the second type of particle towards the color state of the third type of particles, at the viewing side, and repeating steps (iv)-(v) wherein no driving voltage having the same polarity as the first driving voltage is applied between steps (iv) and (v).

In some embodiments, the second period of time in step (ii) is longer than the first period of time in step (i). In some embodiments, steps (i)-(iii) are repeated at least 8 times. In some embodiments, steps (iv) and (v) are repeated at least 8 times. In some embodiments, the amplitude of the second driving voltage is less than 50% of the amplitude of the first driving voltage. In some embodiments, the magnitude of the positive charge of the third particle is less than 50% of the magnitude of the positive charge of the first particle. In some embodiments, the magnitude of the negative charge of the fourth particle is less than 75% of the magnitude of the negative charge of the second particle. In some embodiments, a voltage with a shaking waveform is applied to the pixel before step (i). In some embodiments, the fifth period of time in step (v) is shorter than the second period of time in step (ii). In some embodiments, a third driving voltage is applied to the pixel of the electrophoretic display for a sixth period of time between steps (iii) and (iv), wherein the third driving voltage has the same polarity as the second driving voltage, and the same magnitude as the first amplitude.

A third aspect of the present invention is directed to a driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein (a) the four types of pigment particles have different optical characteristics;

(b) the first type of particles and the third type of particles are positively charged, wherein the first type of particles have a greater magnitude of positive charge than the third particles; and (c) the second type of particles and the fourth type of particles are negatively charged, wherein the second type of particles have a greater magnitude of negative charge than the fourth particles, the method comprises the steps of:

(i) applying a first driving voltage to the pixel of the electrophoretic display for a first period of time at a first amplitude to drive the pixel to a color state of the first or the second type of particles at the viewing side;

(ii) applying no driving voltage to the pixel for a second period of time;

(iii) applying a second driving voltage to the pixel of the electrophoretic display for a third period of time, wherein the second driving voltage has a polarity opposite to that of the first driving voltage and a second amplitude smaller than that of the first amplitude, to drive the pixel from the color state of the first type of particles towards the color state of the fourth type of particles, or from the color state of the second type of particle towards the color state of the third type of particles, at the viewing side;

(iv) applying no driving voltage to the pixel for a fourth period of time, and repeating steps (i)-(iv);

(v) applying no driving voltage to the pixel for a fifth period of time;

(vi) applying the second driving voltage to the pixel of the electrophoretic display for a sixth period of time, to drive the pixel from the color state of the first type of particles towards the color state of the fourth type of particles, or from the color state of the second type of particle towards the color state of the third type of particles, at the viewing side, and repeating steps (v)-(vi) wherein no driving voltage having the same polarity as the first driving voltage is applied between steps (v) and (vi).

In some embodiments, the third period of time in step (iii) is longer than the first period of time in step (i). In some embodiments, steps (i)-(iv) are repeated at least 8 times. In some embodiments, steps (v) and (vi) are repeated at least 8 times. In some embodiments, the amplitude of the second driving voltage is less than 50% of the amplitude of the first driving voltage. In some embodiments, the magnitude of the positive charge of the third particle is less than 50% of the magnitude of the positive charge of the first particle. In some embodiments, the magnitude of the negative charge of the fourth particle is less than 75% of the magnitude of the negative charge of the second particle. In some embodiments, a voltage with a shaking waveform is applied to the pixel before step (i). In some embodiments, the sixth period of time in step (vi) is shorter than the third period of time in step (iii). In some embodiments, a third driving voltage is applied to the pixel of the electrophoretic display for a seventh period of time between steps (iv) and (v), wherein the third driving voltage has the same polarity as the second driving voltage, and the same magnitude as the first amplitude.

BRIEF DESCRIPTION OF THE DRAWINGS

In FIGS. 2A-2F, the yellow and black particles are oppositely charged and the white and red particles are oppositely charged. The yellow and black particles have a higher magnitude of charge than the white and red particles. The color sets are arbitrary and any particular combination of four particles can be used with this system.

DETAILED DESCRIPTION

The electrophoretic fluid related to the present invention comprises two pairs of oppositely charged particles. The first pair consists of a first type of positive particles and a first type of negative particles and the second pair consists of a second type of positive particles and a second type of negative particles.

In the two pairs of oppositely charged particles, one pair carries a stronger charge than the other pair. Therefore the four types of particles may also be referred to as high positive particles, high negative particles, low positive particles and low negative particles.

Figure 1:
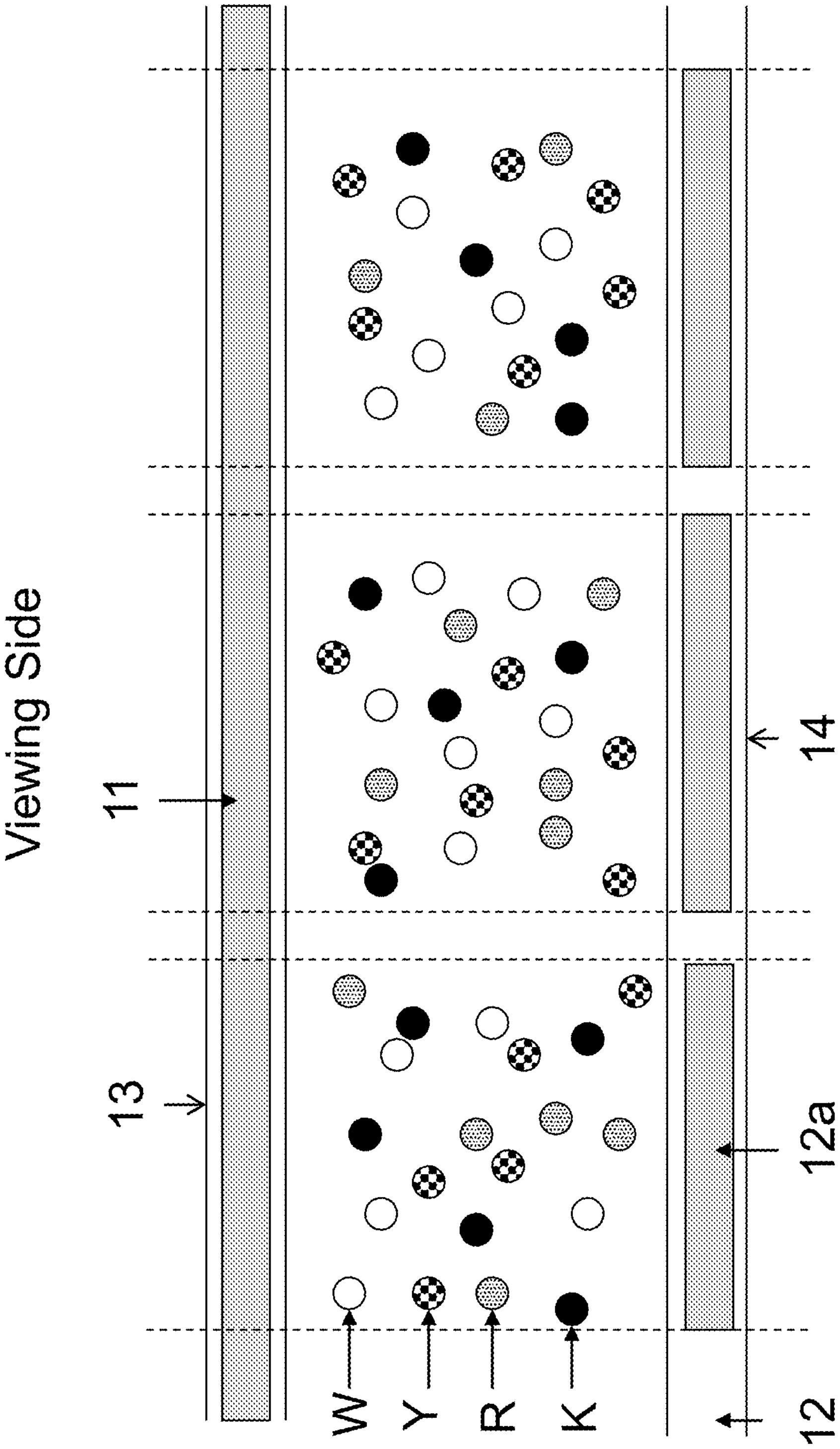
FIG. 1 depicts a display layer including an electrophoretic medium including four particle sets, each particle set having a charge polarity and a charge magnitude and none of the particle sets having the same charge polarity and charge magnitude. The display layer is capable of displaying at least four different color states.

As an example shown in FIG. 1, the black particles (K) and yellow particles (Y) are the first pair of oppositely charged particles, and in this pair, the black particles are the high positive particles and the yellow particles are the high negative particles. The red particles (R) and the white particles (W) are the second pair of oppositely charged particles, and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles.

In addition, the color states of the four types of particles may be intentionally mixed. For example, because yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

It is understood that the scope of the invention broadly encompasses particles of any colors as long as the four types of particles have visually distinguishable colors.

For the white particles, they may be formed from an inorganic pigment, such as TiO2, ZrO2, ZnO, $Al_2O_3$, Sb2O3, BaSO4, PbSO4 or the like.

For the black particles, they may be formed from Cl pigment black 26 or 28 or the like (e.g., manganese ferrite black spinel or copper chromite black spinel) or carbon black.

Particles of non-white and non-black colors are independently of a color, such as, red, green, blue, magenta, cyan or yellow. The pigments for color particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The color particles may also be inorganic pigments, such as red, green, blue and yellow. Examples may include, but are not limited to, CI pigment blue 28, CI pigment green 50 and CI pigment yellow 227.

In addition to the colors, the four types of particles may have other distinct optical characteristics, such as optical transmission, reflectance, luminescence or, in the case of displays intended for machine reading, pseudo-color in the sense of a change in reflectance of electromagnetic wavelengths outside the visible range.

A display layer utilizing the display fluid of the present invention has two surfaces, a first surface (13) on the viewing side and a second surface (14) on the opposite side of the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12*a*).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode.

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oregon, poly(chlorotrifluoroethylene) such as Halocarbon Oils from Halocarbon Product Corp., River Edge, New Jersey, perfluoropolyalkylether such as Galden from Ausimont or Krytox Oils and Greases K-Fluid Series from DuPont, Delaware, polydimethylsiloxane based silicone oil from Dow-corning (DC-200).

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow-through cell for determination of the zeta potential.

The amplitudes of the "high positive" particles and the "high negative" particles may be the same or different. Likewise, the amplitudes of the "low positive" particles and the "low negative" particles may be the same or different. However, the zeta potential of the "high positive" or positive particle with greater charge intensity or greater charge magnitude is larger than the zeta potential of the "low positive" or positive particle with lesser charge intensity or lesser charge magnitude, and the same logic follows for the high negative and low negative particles. In the same medium under the same field a higher charged particle will have a greater electrophoretic mobility, that is, the higher charged particle will traverse the same distance in less time than the lower charged particle.

It is also noted that in the same fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

The following Example illustrates a display device utilizing such a display fluid.

Exemplary Drive Scheme

Figures 2A, 2B:
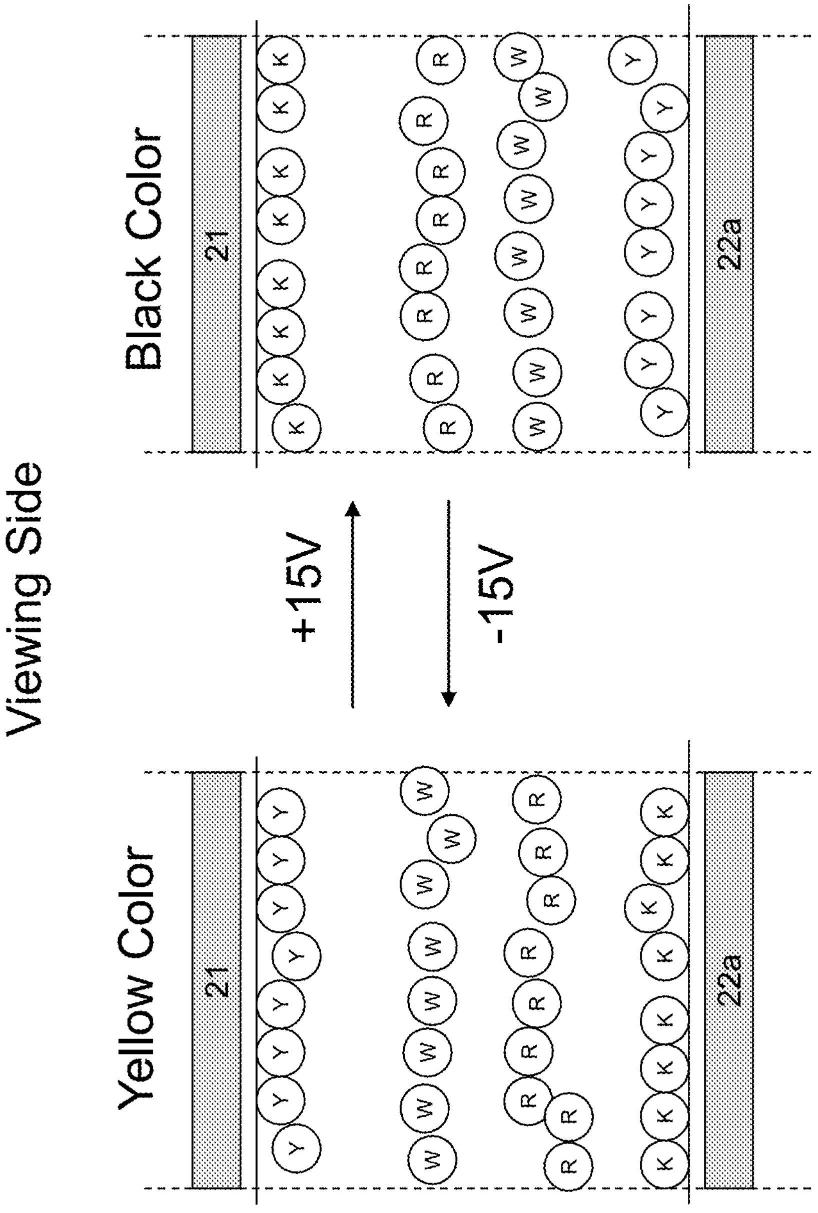
FIGS. 2A-2F illustrate an exemplary electrophoretic medium including four particle sets, each particle set having a charge polarity and a charge magnitude and none of the particle sets having the same charge polarity and charge magnitude.

An exemplary drive scheme using an exemplary four-particle system is demonstrated in FIGS. 2A-2F. The high positive particles are of a black color (K); the high negative particles are of a yellow color (Y); the low positive particles are of a red color (R); and the low negative particles are of a white color (W). In FIG. 2A, when a high negative voltage potential difference (e.g., −15V) is applied to a pixel for a time period of sufficient length, an electric field is generated to cause the yellow particles (Y) to be pushed to the common electrode (21) side and the black particles (K) pulled to the pixel electrode (22*a*) side. The red (R) and white (W) particles, because they carry weaker charges, move slower than the higher charged black and yellow particles and as a result, they stay in the middle of the pixel, with white particles above the red particles. In this case, a yellow color is seen at the viewing side. In FIG. 2B, when a high positive voltage potential difference (e.g., +15V) is applied to the pixel for a time period of sufficient length, an electric field of an opposite polarity is generated which causes the particle distribution to be opposite of that shown in FIG. 2A and as a result, a black color is seen at the viewing side.

Figures 2C, 2D:
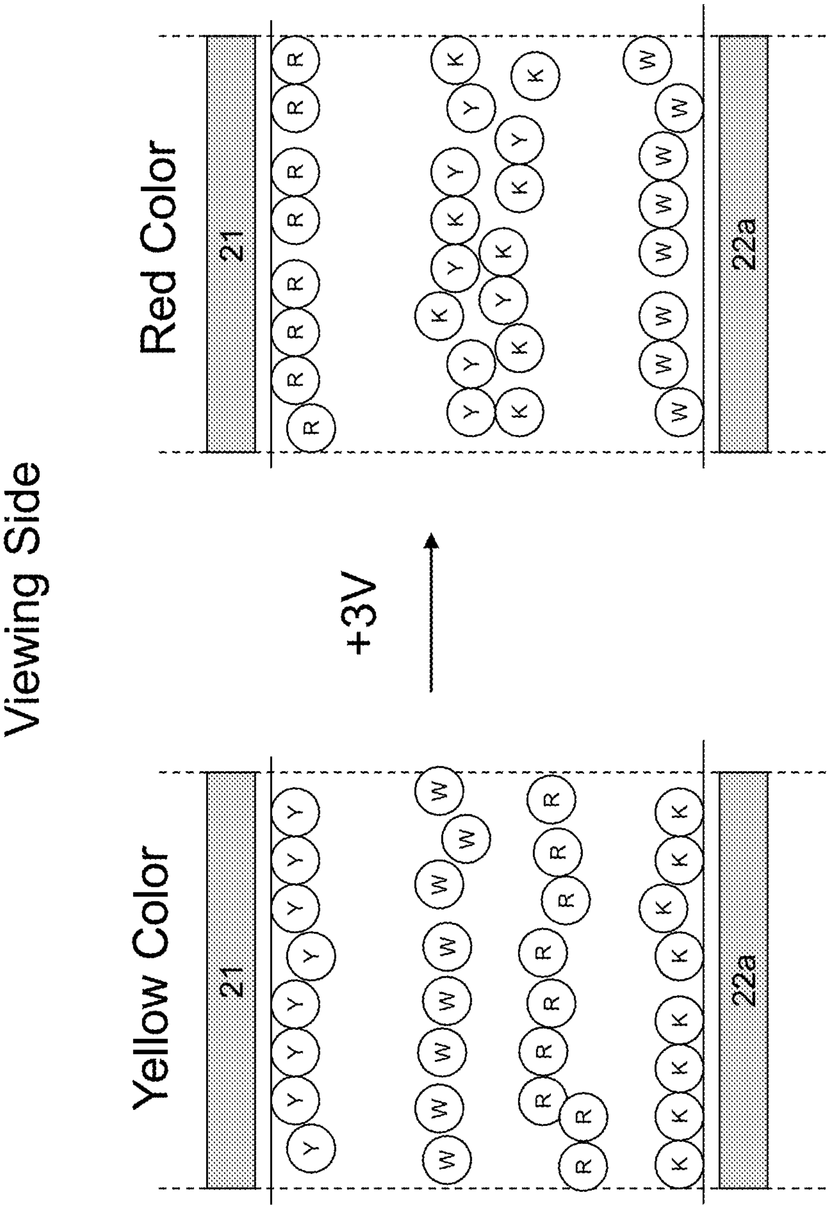

In FIGS. 2C and 2D, when a lower positive voltage potential difference (e.g., +3V) is applied to the pixel of FIG. 2C (that is, driven from the yellow state) for a time period of sufficient length, an electric field is generated to cause the yellow particles (Y) to move towards the pixel electrode (22*a*) while the black particles (K) move towards the common electrode (21). However, when they meet in the middle of the pixel, they slow down significantly and remain there because the electric field generated by the low driving voltage is not strong enough to overcome the strong attraction between them. As shown in FIG. 2D, the electric field generated by the low driving voltage is sufficient to separate the weaker charged (lesser charged) white and red particles, thereby allowing the low positive red particles (R) to move all the way to the common electrode (21) side (i.e., the viewing side) and the low negative (lesser charged) white particles (W) to move to the pixel electrode (22*a*) side. As a result, a red color is seen. It is also noted that in this figure, there are also attraction forces between weaker charged particles (e.g., R) with stronger charged particles of opposite polarity (e.g., Y). However, these attraction forces are not as strong as the attraction force between two types of stronger charged particles (K and Y) and therefore they can be overcome by the electric field generated by the low driving voltage. Importantly, this system allows weaker charged particles to be separated from the stronger charged particles of the opposite polarity.

Figures 2E, 2F:
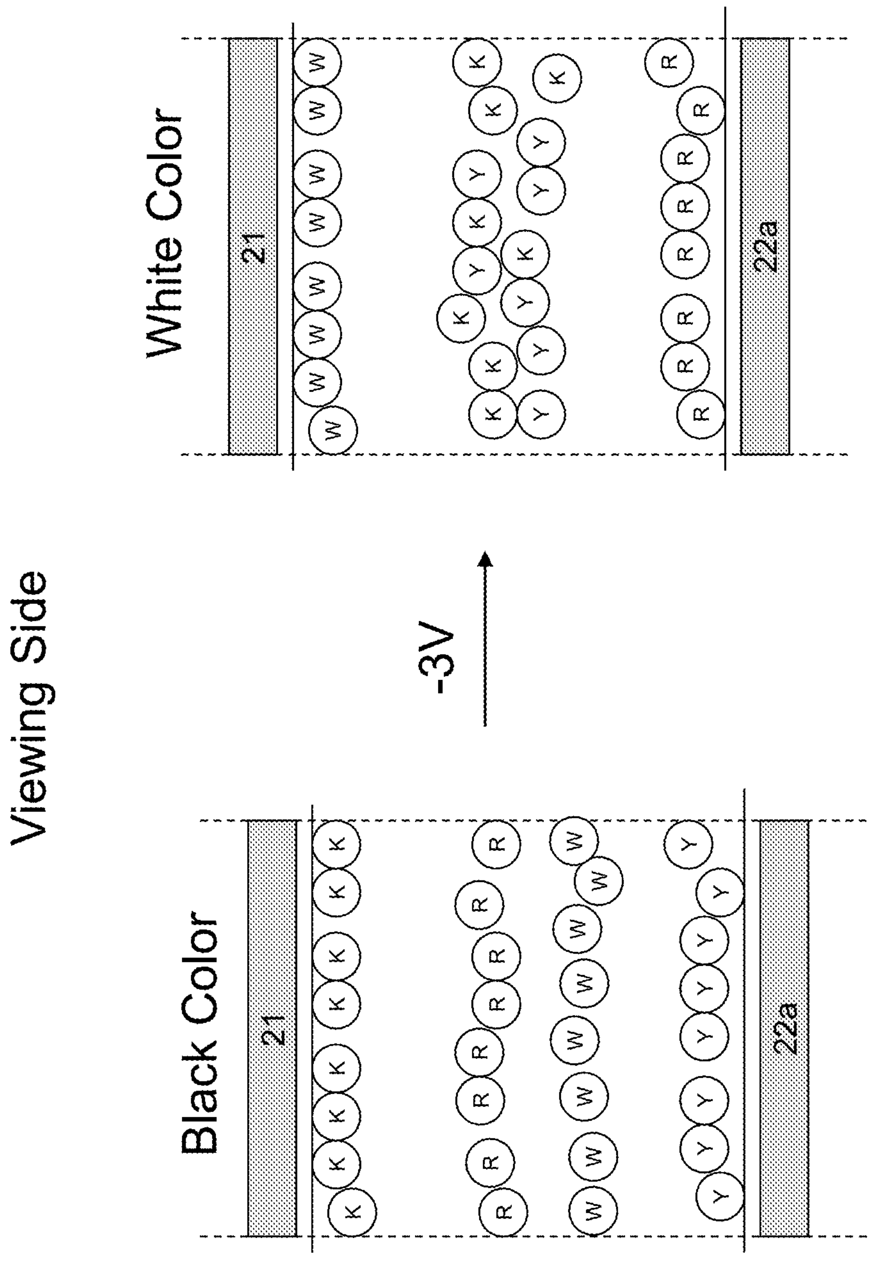

In FIGS. 2E and 2F when a lower negative voltage potential difference (e.g., −3V) is applied to the pixel of FIG. 2E (that is, driven from the yellow state) for a time period of sufficient length, an electric field is generated to cause the black particles (K) to move towards the pixel electrode (22*a*) while the white particles (W) move towards the common electrode (21). When the black and yellow particles meet in the middle of the pixel, they slow down significantly and remain there because the electric field generated by the low driving voltage is not sufficient to overcome the strong attraction between them. As shown in FIG. 2F, the electric field generated by the low driving voltage is sufficient to separate the white and red particles to cause the low negative white particles (W) to move all the way to the common electrode side (i.e., the viewing side) and the low positive red particles (R) move to the pixel electrode side. As a result, a white color is seen. It is also noted that in this figure, there are also attraction forces between weaker charged particles (e.g., W) with stronger charged particles of opposite polarity (e.g., K). However, these attraction forces are not as strong as the attraction force between two types of stronger charged particles (K and Y) and therefore they can be overcome by the electric field generated by the low driving voltage. In other words, weaker charged particles and the stronger charged particles of opposite polarity can be separated.

Although in this Example, the black particles (K) carry a high positive charge, the yellow particles (Y) carry a high negative charge, the red (R) particles carry a low positive charge and the white particles (W) carry a low negative charge, in practice, four sets of particles in an electrophoretic medium of the invention may have a high positive charge, a high negative charge, a low positive charge, and a low negative charge of any color. All of these variations are intended to be within the scope of this application.

It is also noted that the lower voltage potential difference applied to reach the color states in FIGS. 2D and 2F may be about 5% to about 50% of the full driving voltage potential difference required to drive the pixel from the color state of high positive particles to the color state of the high negative particles, or vice versa.

The electrophoretic fluid as described above is filled in display cells. The display cells may be cup-like microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

In order to ensure both color brightness and color purity, a shaking waveform, prior to driving from one color state to another color state, may be used. The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times.

Figure 3:
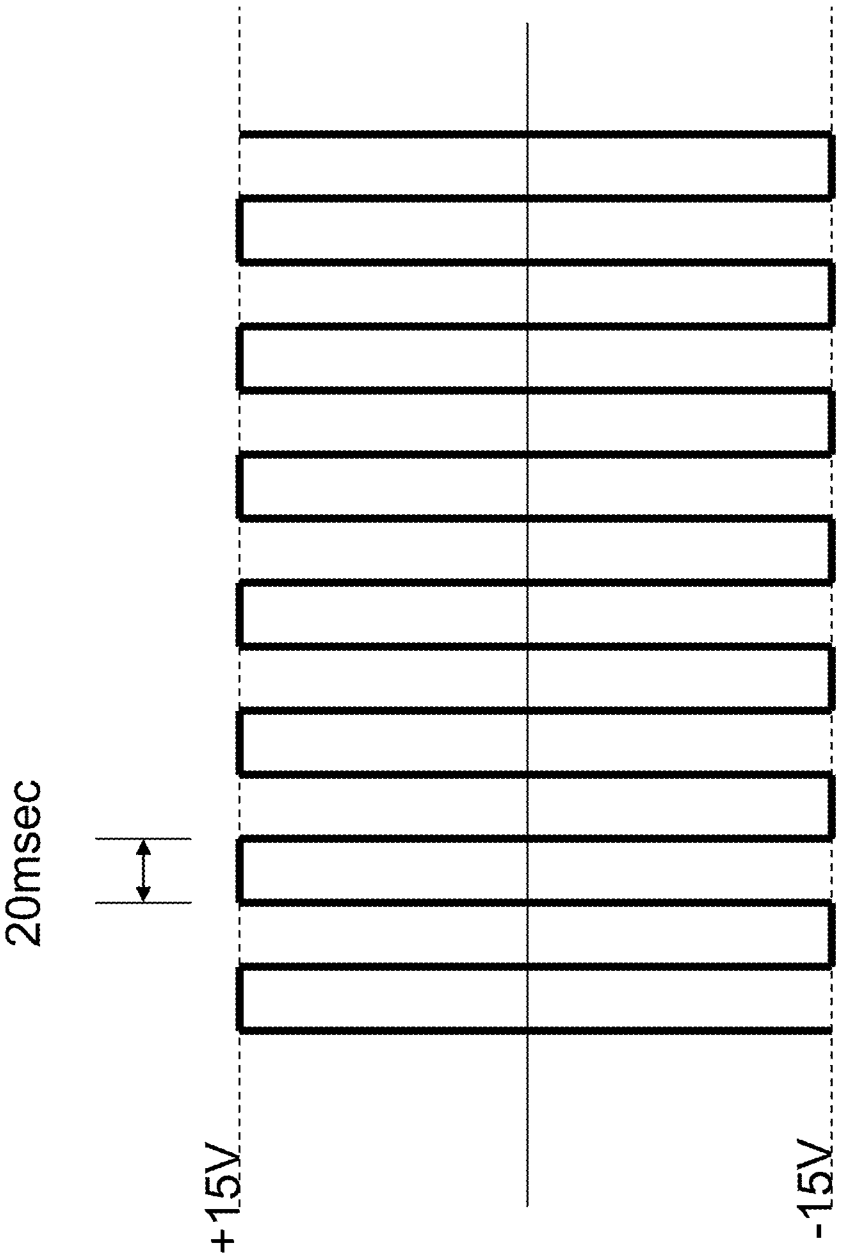
FIG. 3 shows a shaking waveform which may be incorporated into the driving methods.

The total time of such a shaking waveform would be 2000 msec (see FIG. 3). In practice, there may be at least 10 repetitions (i.e., ten pairs of positive and negative pulses) in a shaking pulse. A driving sequence may include more than one shaking pulse. The shaking waveform may be applied regardless of the optical state (black, white, red or yellow) before a driving voltage is applied. After the shaking waveform is applied, the optical state would not be a pure white, pure black, pure yellow or pure red. Instead, the color state would be from a mixture of the four types of pigment particles.

Each of the driving pulse in the shaking waveform is applied for not exceeding 50% (or not exceeding 30%, 10% or 5%) of the driving time required from the full black state to the full yellow state, or vice versa, in the example. For example, if it takes 300 msec to drive a display device from a full black state to a full yellow state, or vice versa, the shaking waveform may consist of positive and negative pulses, each applied for not more than 150 msec. In practice, it is preferred that the pulses are shorter. The shaking waveform as described may be used in the driving methods of the present invention. [It is noted that in all of the drawings throughout this application, the shaking waveform is abbreviated (i.e., the number of pulses is fewer than the actual number).]

In addition, in the context of the present application, a high driving voltage (VH1 or VH2) is defined as a driving voltage which is sufficient to drive a pixel from the color state of high positive particles to the color state of high negative particles, or vice versa (see FIGS. 2A and 2B). In this scenario as described, a low driving voltage (VL1 or VL2) is defined as a driving voltage which may be sufficient to drive a pixel to the color state of weaker charged particles from the color state of higher charged particles (see FIGS. 2D and 2F). In general, the amplitude of VL (e.g., VL1 or VL2) is less than 50%, or preferably less than 40%, of the amplitude of VH (e.g., VH1 or VH2).

Figure 4:
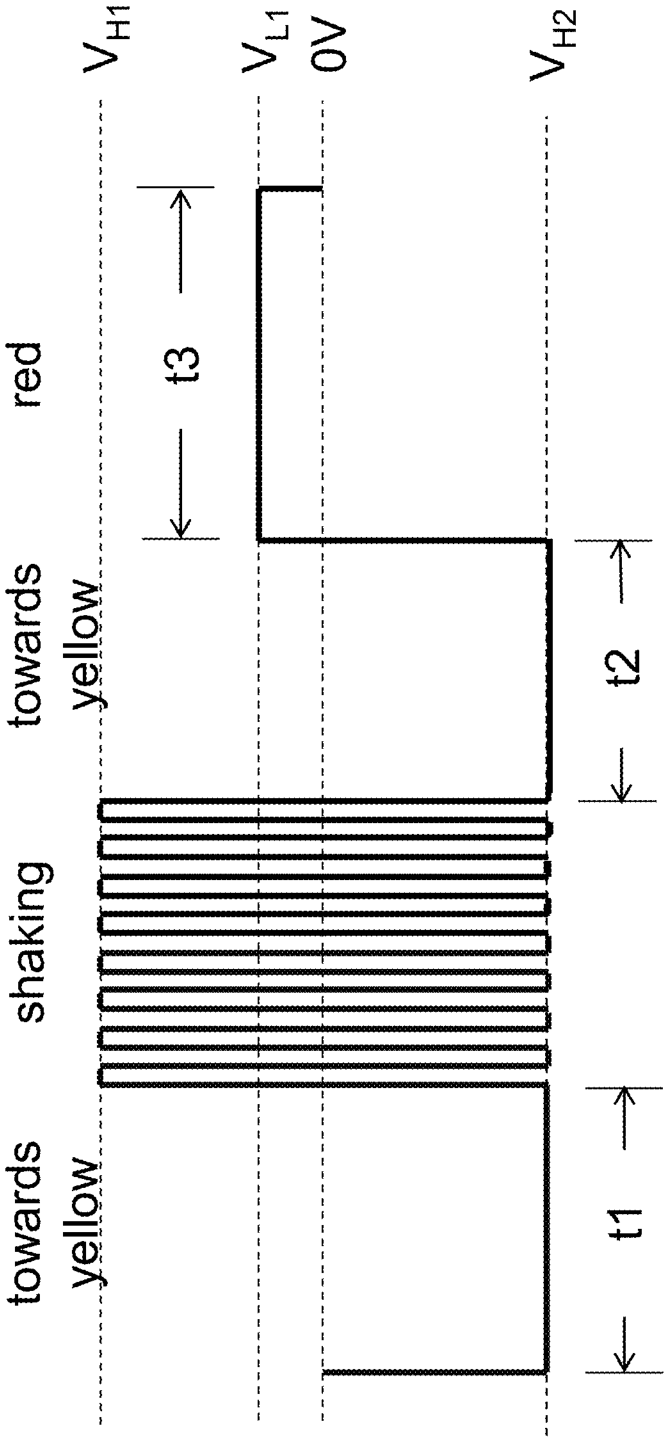
FIGS. 4 and 5 illustrate the first driving method of the present invention.

The First Driving Method:

Part A:

FIG. 4 illustrates a driving method to drive a pixel from a yellow color state (high negative) to a red color state (low positive). In this method, a high negative driving voltage (VH2, e.g., −15V) is applied for a period of t2, to drive the pixel towards a yellow state after a shaking waveform. From the yellow state, the pixel may be driven towards the red state by applying a low positive voltage (VL1, e.g., +5V) for a period of t3 (that is, driving the pixel from FIG. 2C to FIG. 2D). The driving period t2 is a time period sufficient to drive a pixel to the yellow state when VH2 is applied and the driving period t3 is a time period sufficient to drive the pixel to the red state from the yellow state when VL1 is applied. A driving voltage is preferably applied for a period of t1 before the shaking waveform to ensure DC balance. The entire waveform of FIG. 4 is DC balanced. The term "DC balance", throughout this application, is intended to mean that the driving voltages applied to a pixel is substantially zero when integrated over a period of time (e.g., the period of an entire waveform). The DC balance can be achieved by having each stage of the waveform balanced, that is, a first positive voltage will be chosen such that integrating over the subsequent negative voltage results in zero or substantially zero. Later, if the stage is repeated, the integrated voltage over the series of repeats will also be zero or substantially zero, i.e., DC balanced." Alternatively, stage (or stages) of the waveform may be imbalanced in that integrating over this stage results in a positive (or negative) DC offset.

However, later stages may be designed to be imbalanced in the opposite direction, so that the total waveform is DC balanced.

Figure 5:
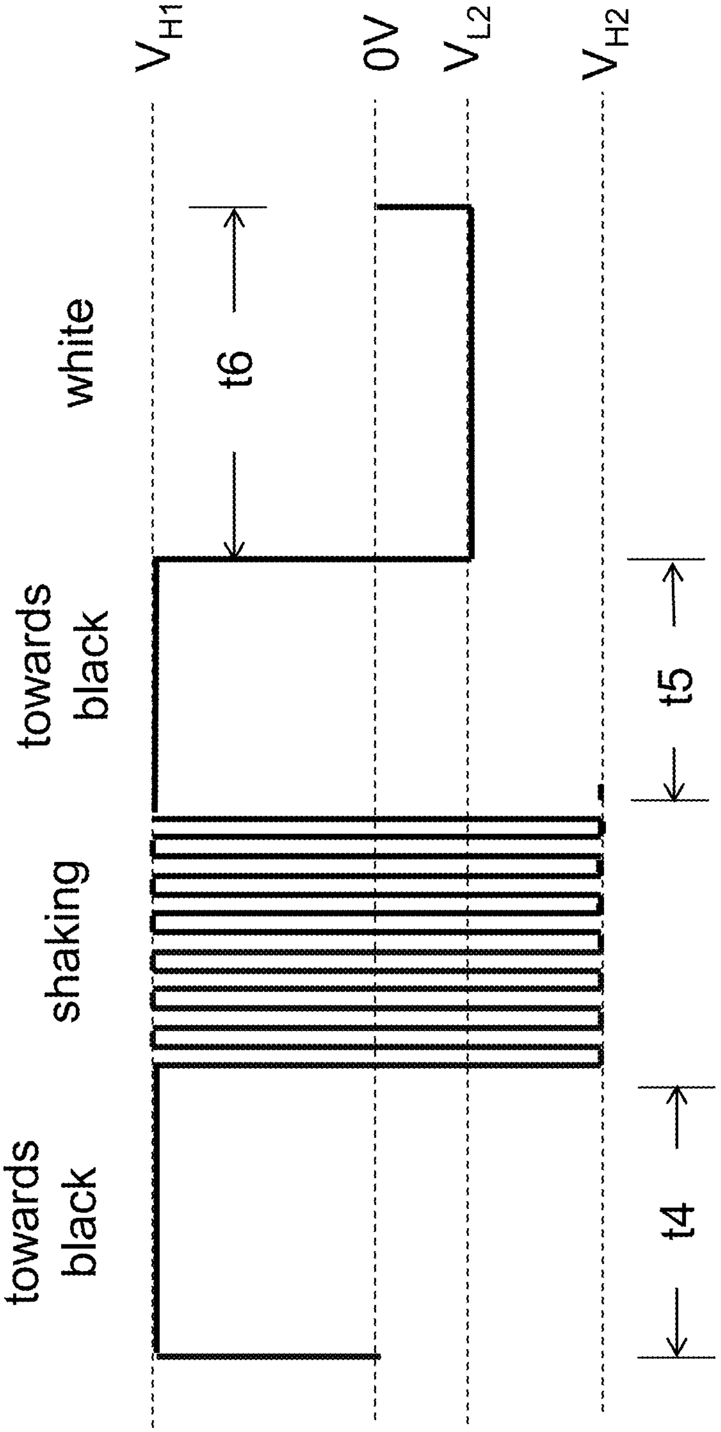

Part B:

FIG. 5 illustrates a driving method to drive a pixel from a black color state (high positive) to a white color state (low negative). In this method, a high positive driving voltage (VH1, e.g., +15V) is applied for a period of t5, to drive the pixel towards a black state after a shaking waveform. From the black state, the pixel may be driven towards the white state by applying a low negative voltage (VL2, e.g., −5V) for a period of t6 (that is, driving the pixel from FIG. 2E to FIG. 2F). The driving period t5 is a time period sufficient to drive a pixel to the black state when VH1 is applied and the driving period t6 is a time period sufficient to drive the pixel to the white state from the black state when VL2 is applied. A driving voltage is preferably applied for a period of t4 before the shaking waveform to ensure DC balance. In an embodiment, the entire waveform of FIG. 5 is DC balanced.

In general, the driving method of FIGS. 4 and 5 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

applying a first driving voltage to a pixel in the electrophoretic display for a first period of time to drive the pixel towards the color state of the first or second type of particles at the viewing side; and (ii) applying a second driving voltage to the pixel for a second period of time, wherein the second driving voltage has polarity opposite that of the first driving voltage and an amplitude lower than that of the first driving voltage, to drive the pixel from the color state of the first type of particles towards the color state of the fourth type of particles or from the color state of the second type of particle towards the color state of the third type of particles, at the viewing side.

Figure 6:
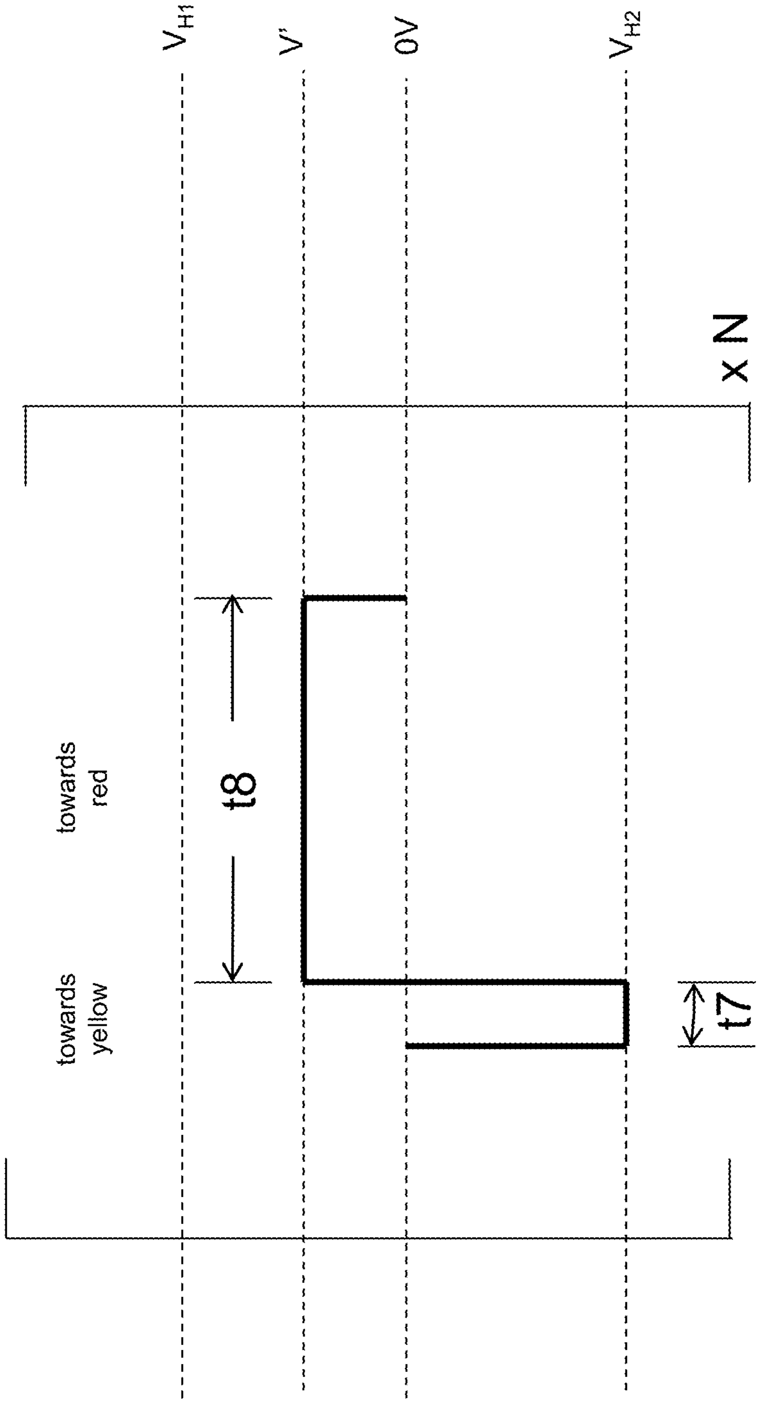
FIGS. 6 and 9 illustrate the second driving method of the present invention.

The Second Driving Method:

Part A:

The second driving method of the present invention is illustrated in FIG. 6. It relates to a driving waveform which is used to replace the driving period of t3 in FIG. 4.

In an initial step, the high negative driving voltage (VH2, e.g., −15V) is applied for a period of t7 to push the yellow particles towards the viewing side, which is followed by a positive driving voltage (+V') for a period of t8, which pulls the yellow particles down and pushes the red particles towards the viewing side. The amplitude of +V' is lower than that of VH (e.g., VH1 or VH2). In one embodiment, the amplitude of the +V' is less than 50% of the amplitude of VH (e.g., VH1 or VH2). In one embodiment, t8 is greater than t7. In one embodiment, t7 may be in the range of 20-400 msec and t8 may be ≥200 msec.

Figure 7:
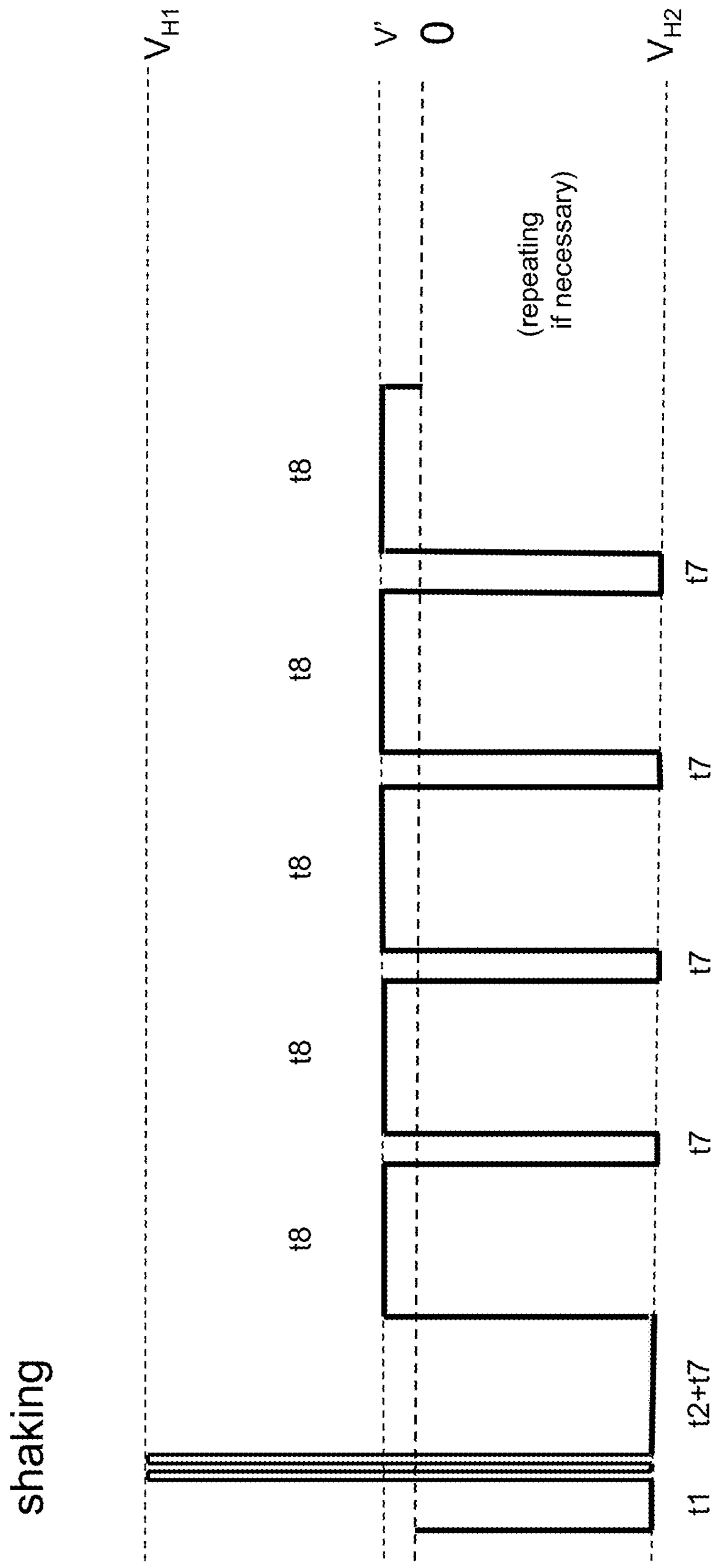
FIGS. 7, 8, 10 and 11 show driving sequences utilizing the second driving method of the present invention.
Figure 8:
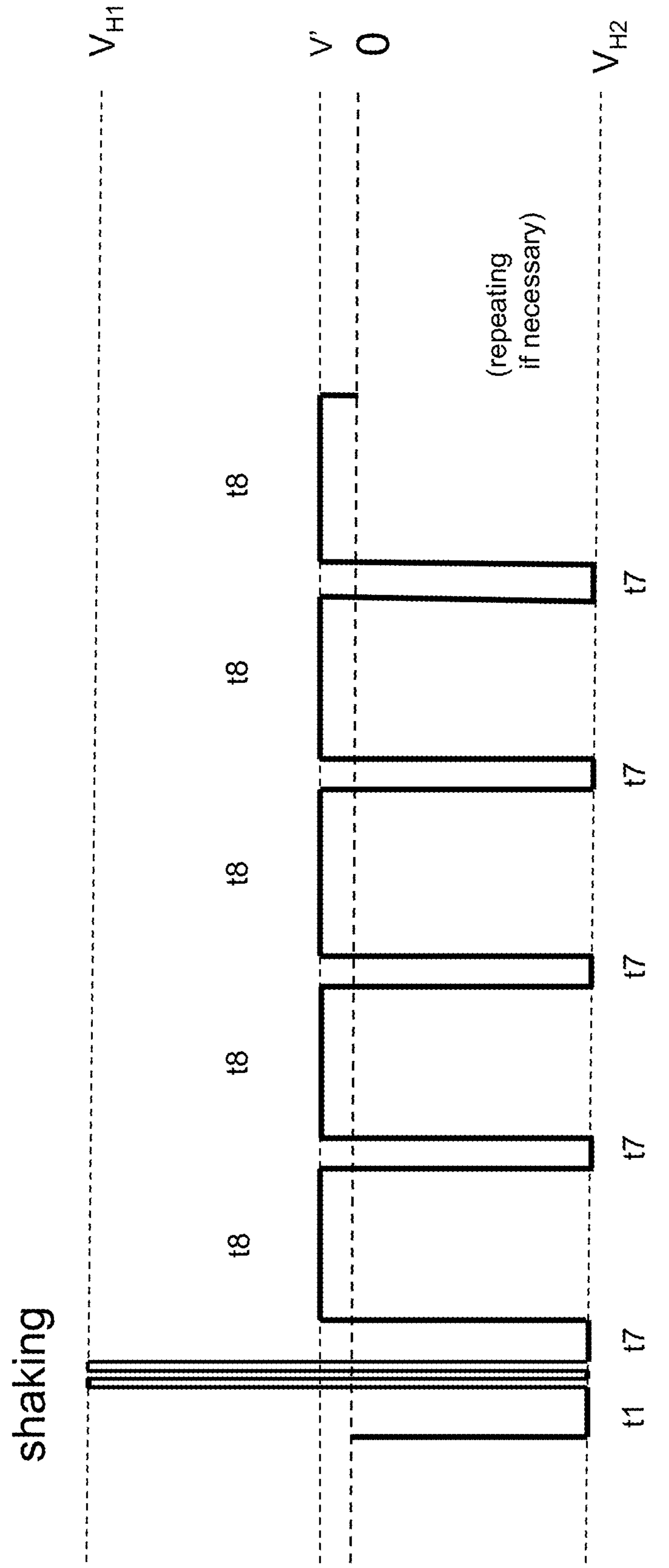

The waveform of FIG. 6 is repeated for at least 2 cycles (N≥2), preferably at least 4 cycles and more preferably at least 8 cycles. The red color becomes more intense after each driving cycle, as measured with a hand held spectrophotometer. As stated, the driving waveform as shown in FIG. 6 may be used to replace the driving period of t3 in FIG. 4 (see FIG. 7). In other words, the driving sequence may be: shaking waveform, followed by driving towards the yellow state for a period of t2 and then applying the waveform of FIG. 6. In another embodiment, the step of driving to the yellow state for a period of t2 may be eliminated altogether, and in this case, a shaking waveform is applied before applying the waveform of FIG. 6 (see FIG. 8). In one embodiment, the entire waveform of FIG. 7 is DC balanced. In another embodiment, the entire waveform of FIG. 8 is DC balanced.

Figure 9:
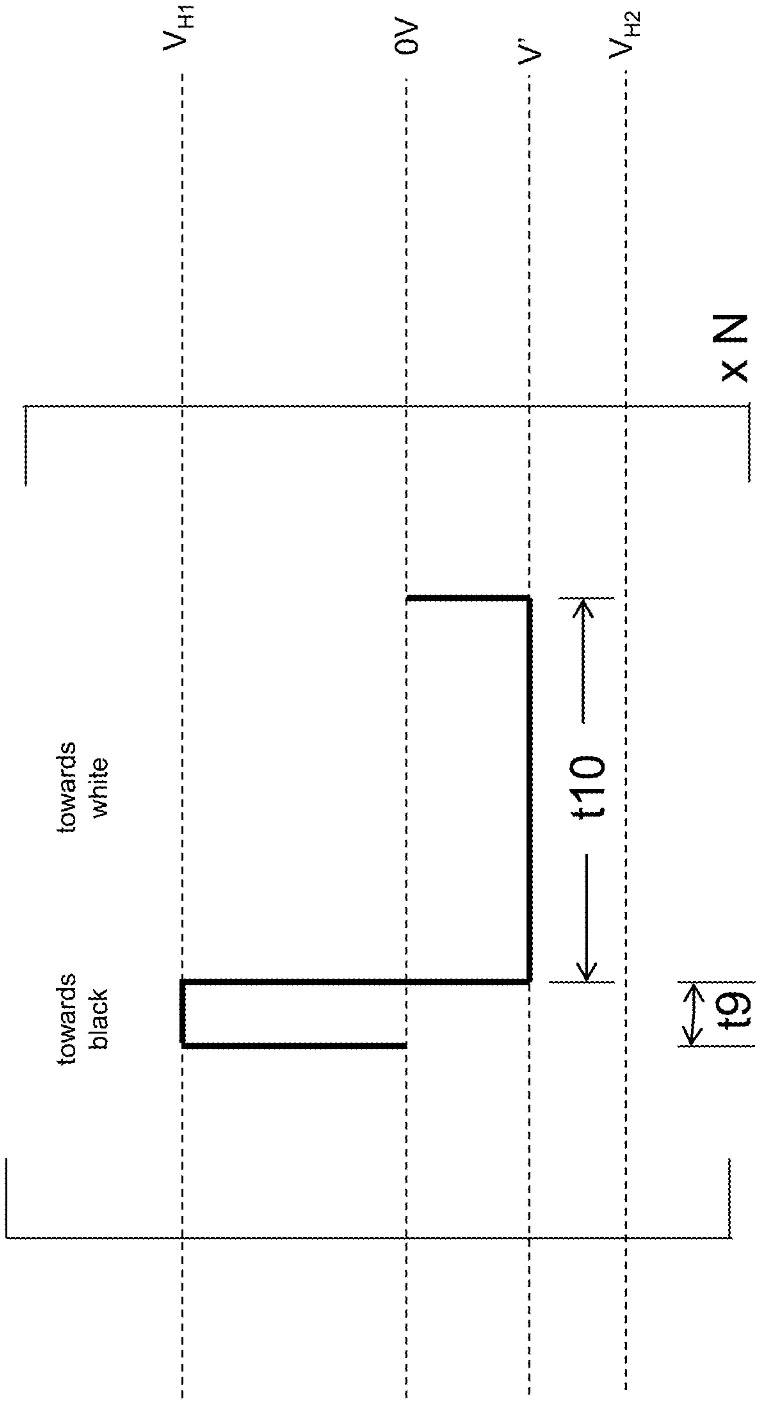
Figure 10:
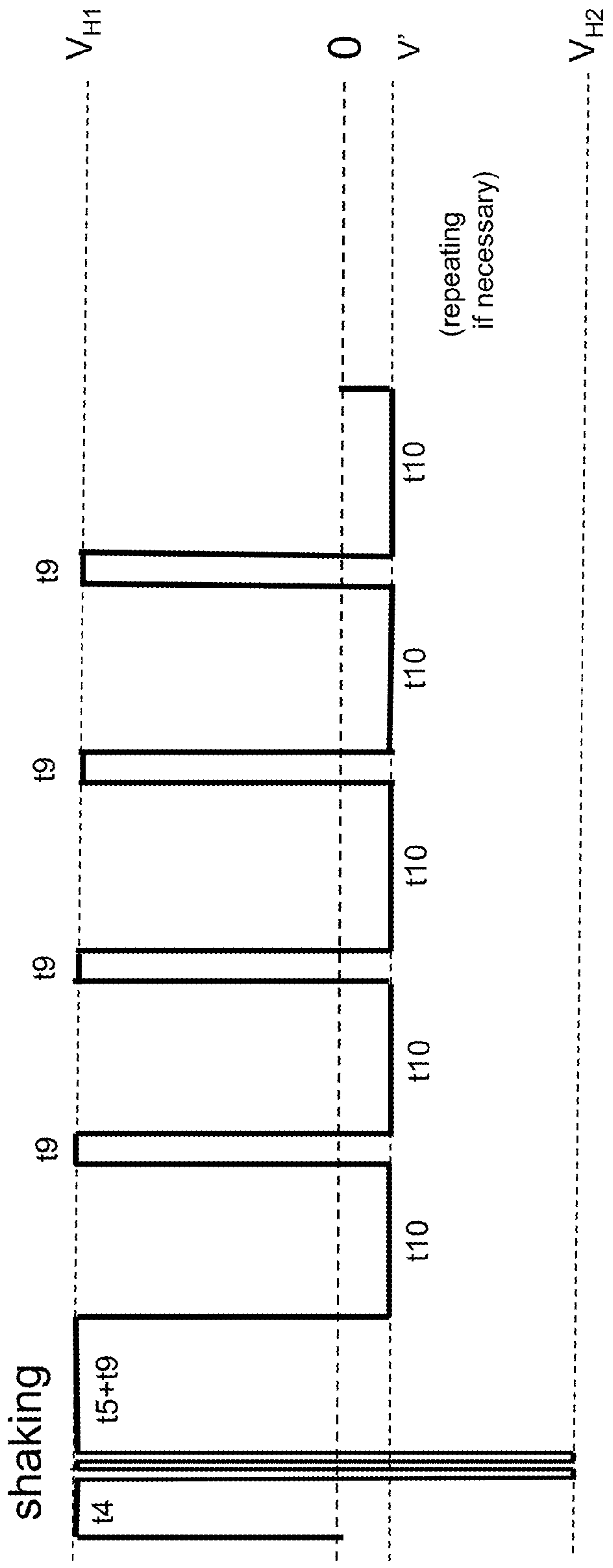
Figure 11:
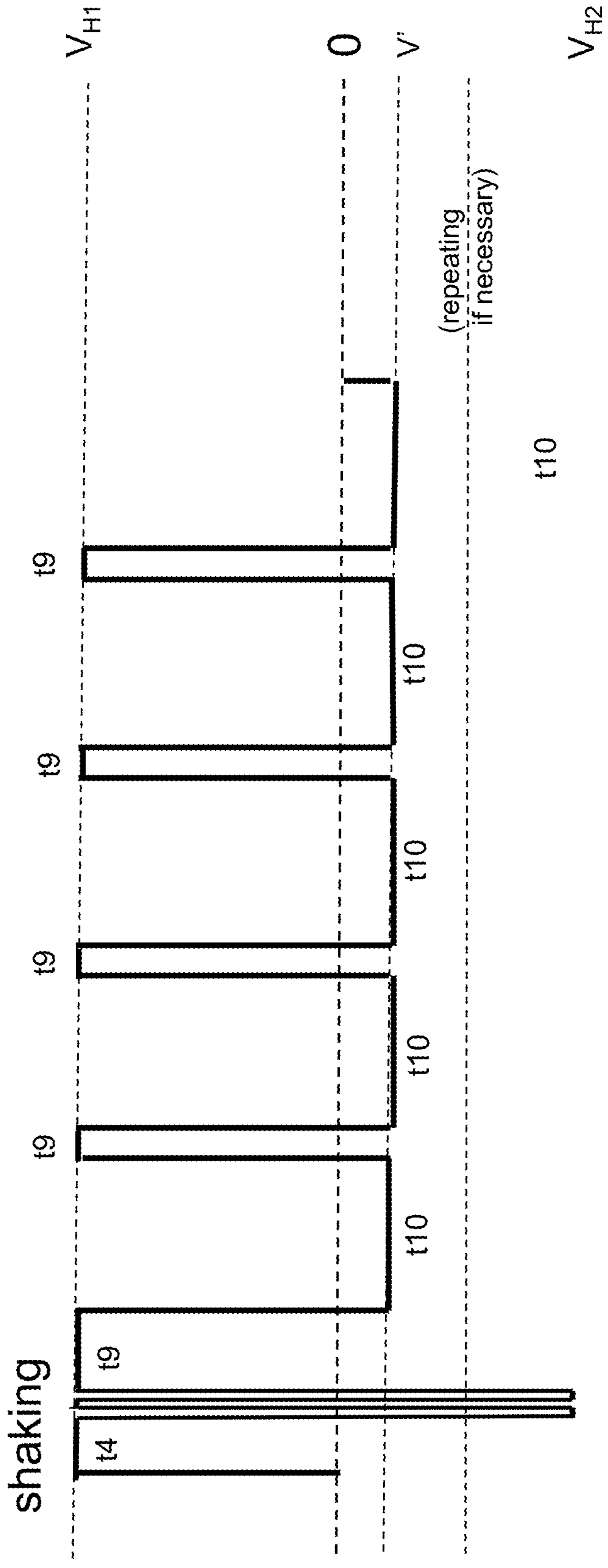

Part B:

In a similar fashion, FIG. 9 illustrates a driving waveform which is used to replace the driving period of t6 in FIG. 5. In an initial step, a high positive driving voltage (VH1, e.g., +15V) is applied, for a period of t9 to push the black particles towards the viewing side, which is followed by applying a negative driving voltage (−V') for a period of t10, which pulls the black particles down and pushes the white particles towards the viewing side. The amplitude of the −V' is lower than that of VH (e.g., VH1 or VH2). In one embodiment, the amplitude of −V' is less than 50% of the amplitude of VH (e.g., VH1 or VH2). In one embodiment, t10 is greater than t9. In one embodiment, t9 may be in the range of 20-400 msec and t10 may be ≥200 msec. The waveform of FIG. 9 is repeated for at least 2 cycles (N≥2), preferably at least 4 cycles and more preferably at least 8 cycles. The white color becomes more intense after each driving cycle. As stated, the driving waveform as shown in FIG. 9 may be used to replace the driving period of t6 in FIG. 5 (see FIG. 10). In other words, the driving sequence may be: shaking waveform, followed by driving towards the black state for a period of t5 and then applying the waveform of FIG. 9. In another embodiment, the step of driving to the black state for a period of t5 may be eliminated and in this case, a shaking waveform is applied before applying the waveform of FIG. 9 (see FIG. 11). In one embodiment, the entire waveform of FIG. 10 is DC balanced. In another embodiment, the entire waveform FIG. 11 is DC balanced.

This second driving method, represented in FIGS. 6-11, may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

applying a first driving voltage to a pixel in the electrophoretic display for a first period of time to drive the pixel towards the color state of the first or second type of particles at the viewing side;

(ii) applying a second driving voltage to the pixel for a second period of time, wherein the second period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particle towards the color state of the third type of particles, at the viewing side; and repeating steps (i) and (ii).

In one embodiment, the amplitude of the second driving voltage is less than 50% of the amplitude of the first driving voltage. In one embodiment, steps (i) and (ii) are repeated at least 2 times, preferably at least 4 times and more preferably at least 8 times. In one embodiment, the method further comprises a shaking waveform before step (i). In one embodiment, the method further comprises driving the pixel to the color state of the first or second type of particles after the shaking waveform but prior to step (i).

Figure 12:
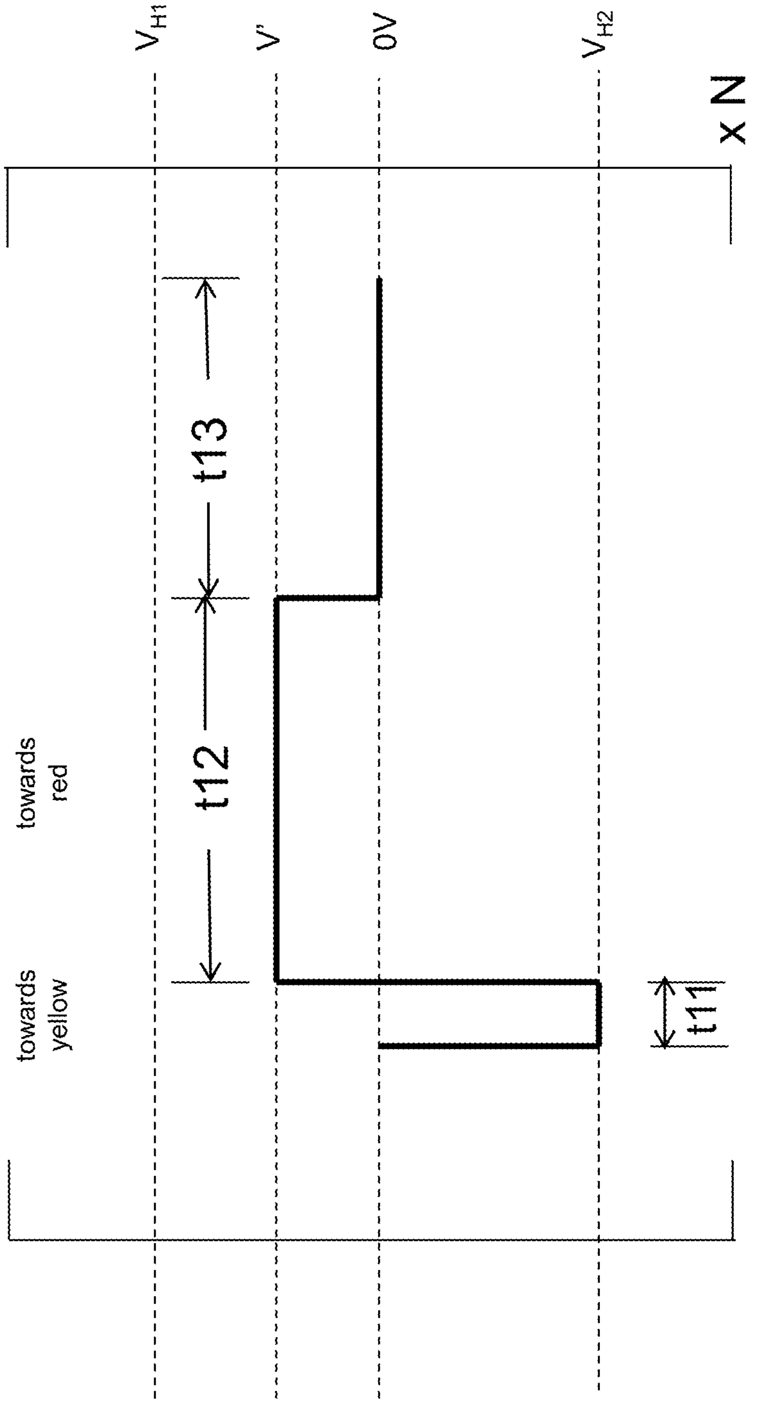
FIGS. 12 and 15 illustrate the third driving method of the present invention.

The Third Driving Method:

Part A:

The third driving method of the present invention is illustrated in FIG. 12. It relates to an alternative to the driving waveform of FIG. 6, which may also be used to replace the driving period of t3 in FIG. 4. In this alternative waveform, there is a wait time t13 added. During the wait time, no driving voltage is applied. The entire waveform of FIG. 12 is also repeated at least 2 times (N≥2), preferably at least 4 times and more preferably at least 8 times. The waveform of FIG. 12 is designed to release the charge imbalance stored in the dielectric layers and/or at the interfaces between layers of different materials, in an electrophoretic display device, especially when the resistance of the dielectric layers is high, for example, at a low temperature. (This charge build-up is also known as remnant voltage.) In the context of the present application, the term "low temperature" refers to a temperature below about 10° C., e.g., 0° C. or colder, e.g., −5° C. or colder, e.g., −10° C. or colder, e.g., −20° C. or colder.

The wait time can dissipate the unwanted charge stored in the dielectric layers and cause the short pulse (t11) for driving a pixel towards the yellow state and the longer pulse (t12) for driving the pixel towards the red state to be more efficient. As a result, this alternative driving method will bring a better separation of the low charged pigment particles from the higher charged ones. Additionally, because there is more time for the stored charge in the dielectric layers to dissipate, there is less drift in the final optical state of the display.

Figure 13:
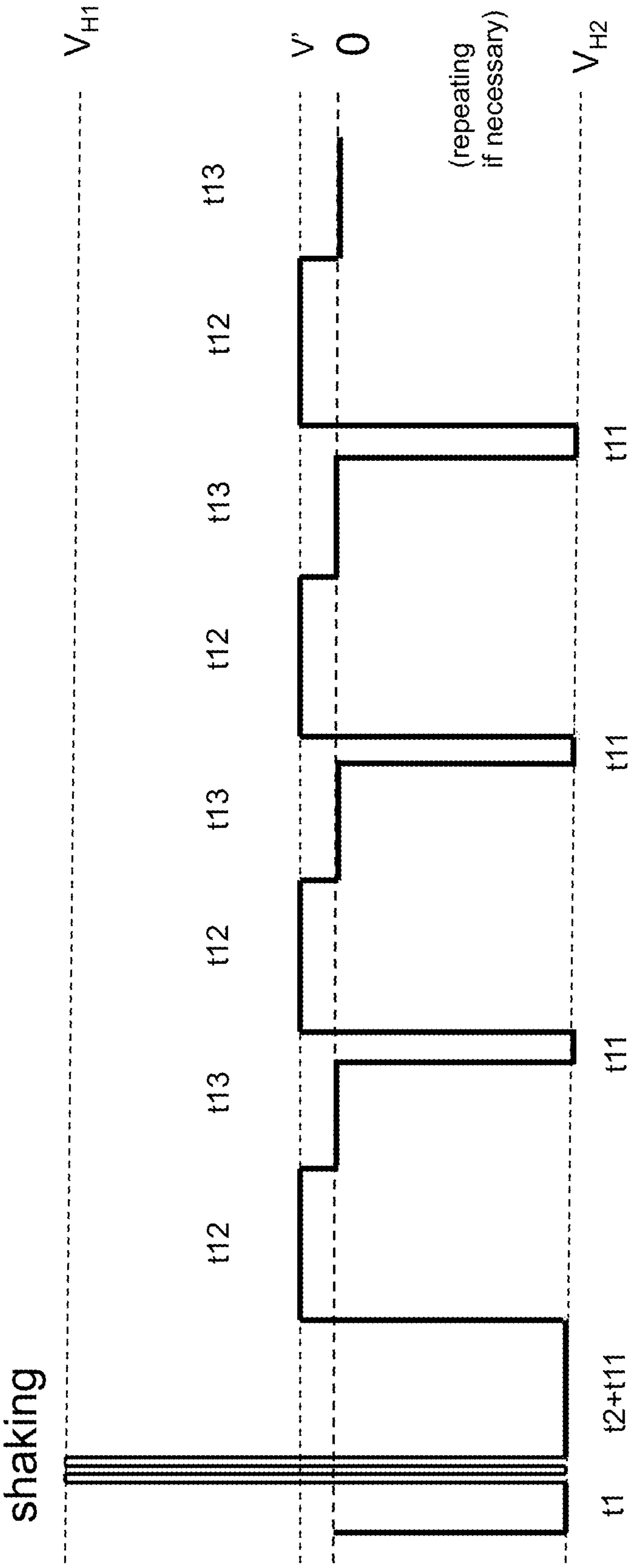
FIGS. 13, 14, 16 and 17 show driving sequences utilizing the third driving method of the present invention.
Figure 14:
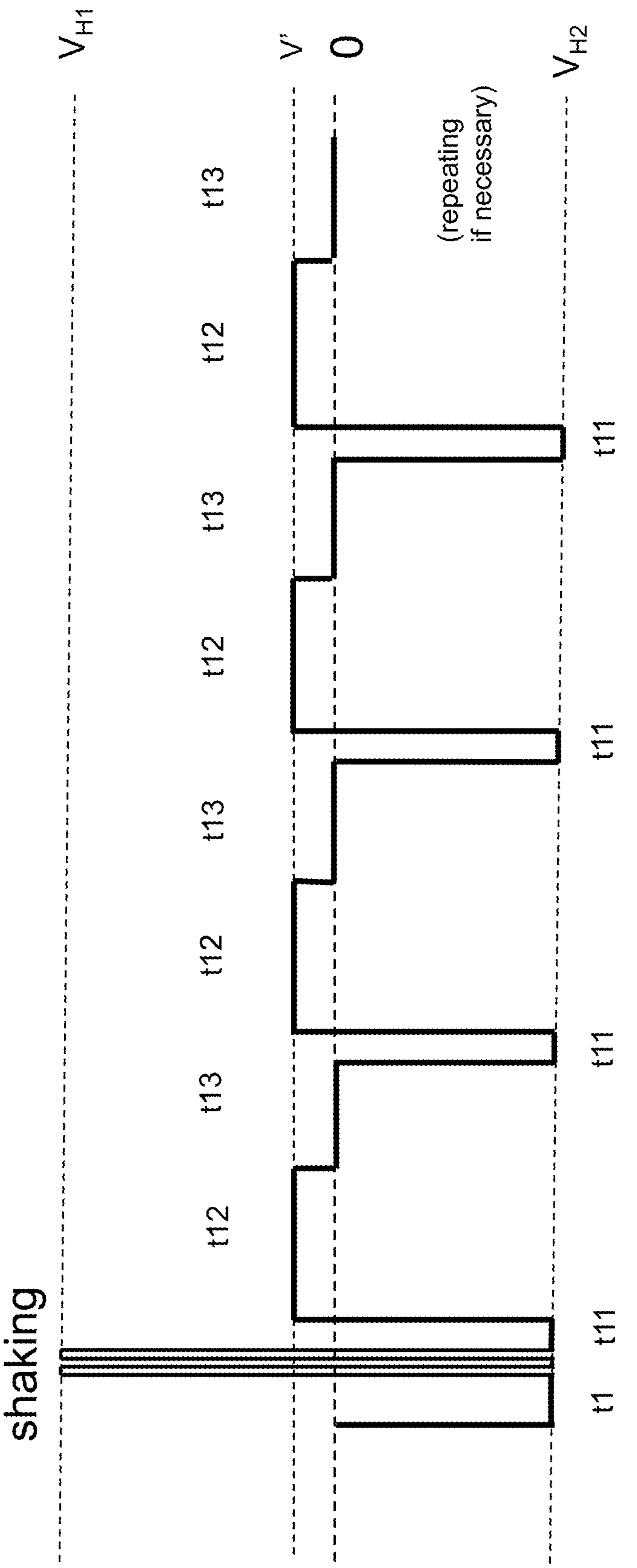

The time periods, t11 and t12, are similar to t7 and t8 in FIG. 6, respectively. In other words, t12 is greater than t11. The wait time (t13) can be in a range of 5-5,000 msec, depending on the resistance of the dielectric layers. As stated, the driving waveform as shown in FIG. 12 may also be used to replace the driving period of t3 in FIG. 4 (see FIG. 13). In other words, the driving sequence may be: shaking waveform, followed by driving towards the yellow state for a period of t2 and then applying the waveform of FIG. 12. In another embodiment, the step of driving to the yellow state for a period of t2 may be eliminated and in this case, a shaking waveform is applied before applying the waveform of FIG. 12 (see FIG. 14). In one embodiment, the entire waveform of FIG. 13 is DC balanced. In another embodiment, the entire waveform of FIG. 14 is DC balanced.

Figure 15:
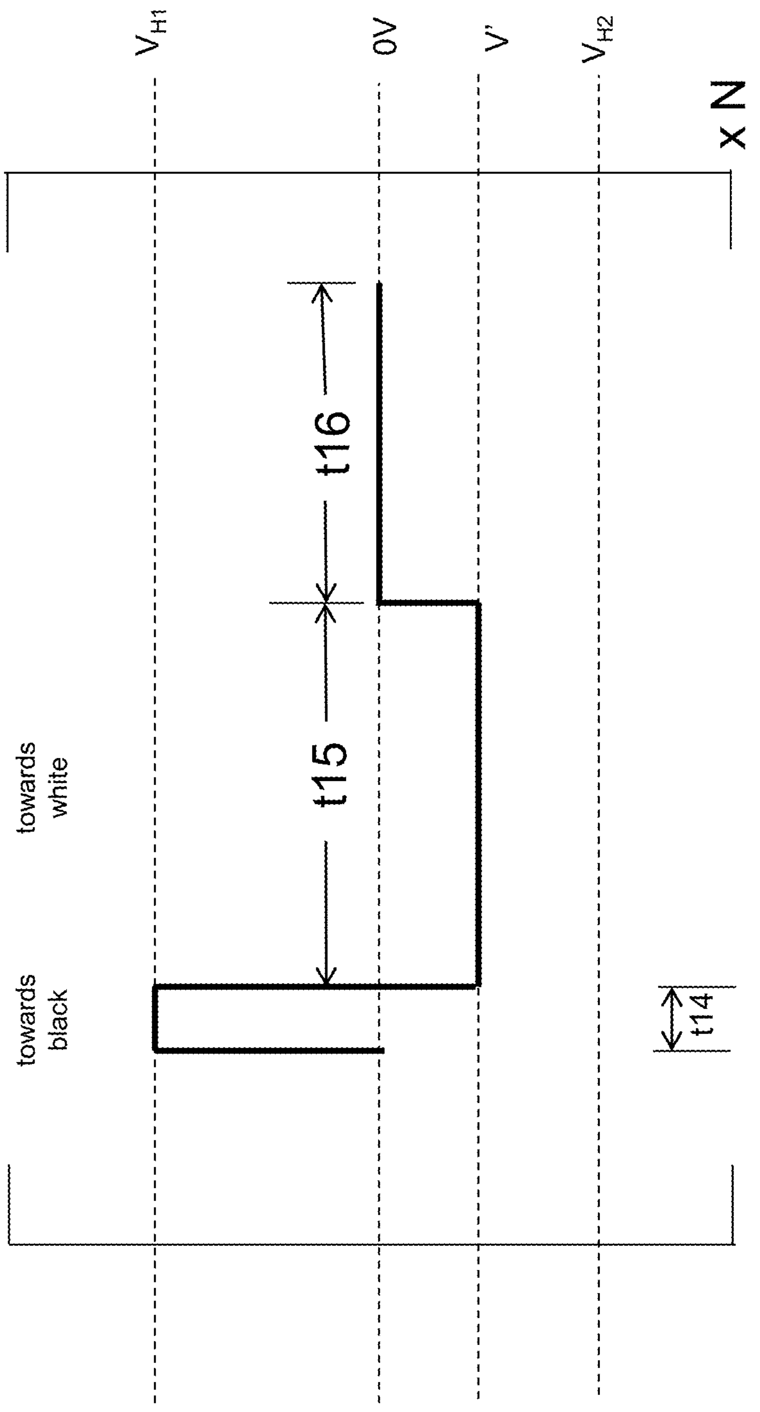
Figure 16:
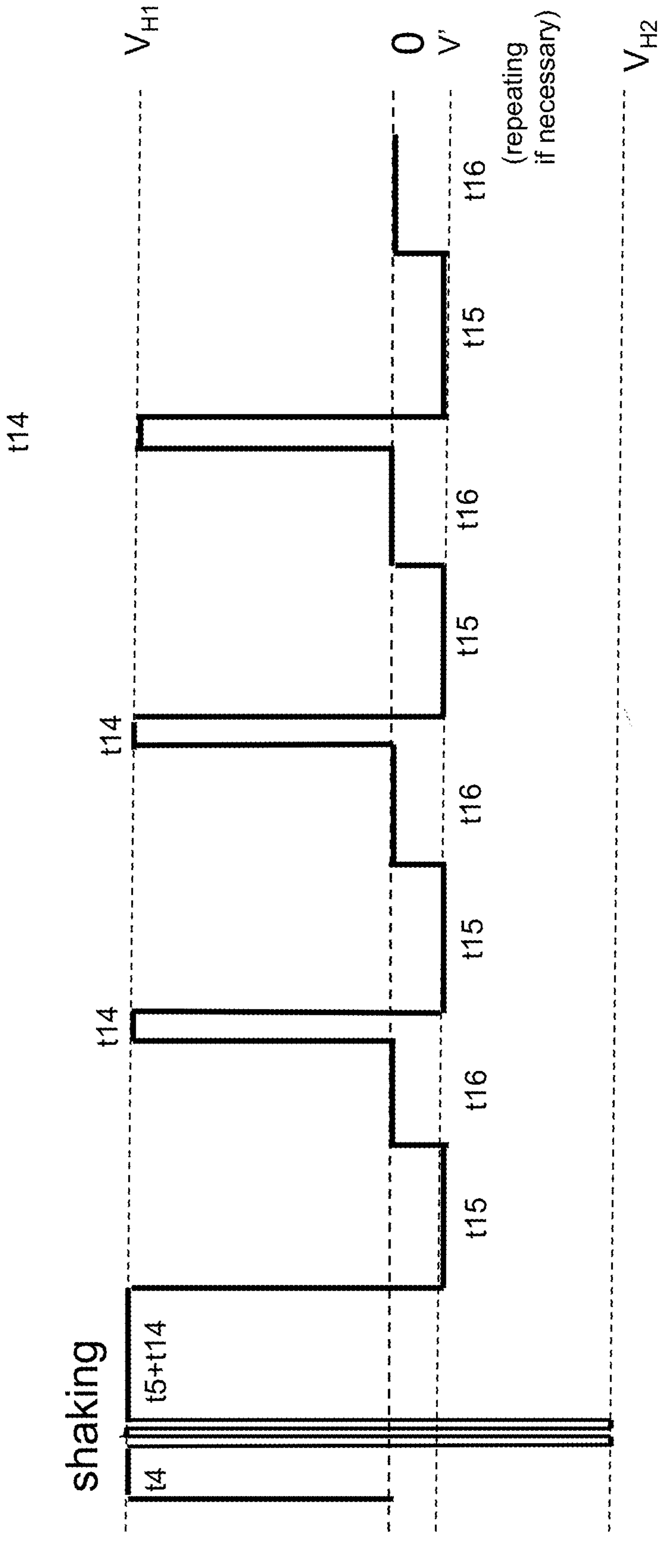
Figure 17:
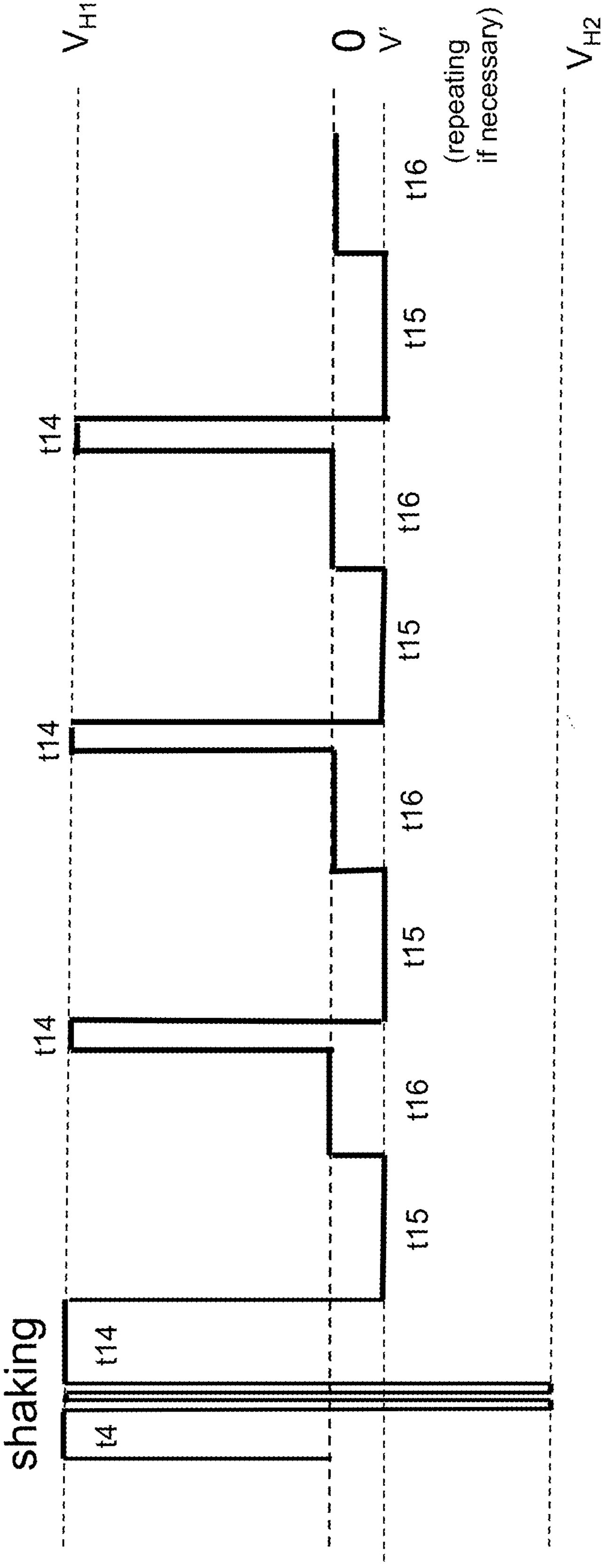

Part B:

FIG. 15 illustrates an alternative to the driving waveform of FIG. 9, which may also be used to replace the driving period of t6 in FIG. 5. In this alternative waveform, there is a wait time t16 added. During the wait time, no driving voltage is applied. The entire waveform of FIG. 15 is also repeated at least 2 times (N≥2), preferably at least 4 times and more preferably at least 8 times. Like the waveform of FIG. 12, the waveform of FIG. 15 is also designed to release the charge imbalance stored in the dielectric layers and/or at the interfaces of layers of different materials, in an electrophoretic display device. As stated above, the wait time presumably can dissipate the unwanted charge stored in the dielectric layers and cause the short pulse (t14) for driving a pixel towards the black state and the longer pulse (t15) for driving the pixel towards the white state to be more efficient. The time periods, t14 and t15, are similar to t9 and t10 in FIG. 9, respectively. In other words, t15 is greater than t14. The wait time (t16) may also be in a range of 5-5,000 msec, depending on the resistance of the dielectric layers. As stated, the driving waveform as shown in FIG. 15 may also be used to replace the driving period of t6 in FIG. 5 (see FIG. 16). In other words, the driving sequence may be: shaking waveform, followed by driving towards the black state for a period of t5 and then applying the waveform of FIG. 15. In another embodiment, the step of driving to the black state for a period of t5 may be eliminated and in this case, a shaking waveform is applied before applying the waveform of FIG. 15 (see FIG. 17). In one embodiment, the entire waveform of FIG. 16 is DC balanced. In another embodiment, the entire waveform of FIG. 17 is DC balanced.

The third driving method, represented in FIGS. 12-17, may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first type or second type of particles at the viewing side;

(ii) applying a second driving voltage to the pixel for a second period of time, wherein the second period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particle towards the color state of the third type of particles, at the viewing side;

(iii) applying no driving voltage to the pixel for a third period of time; and repeating steps (i)-(iii).

In one embodiment, the amplitude of the second driving voltage is less than 50% of the amplitude of the first driving voltage. In one embodiment, steps (i), (ii) and (iii) are repeated at least 2 times, preferably at least 4 times and more preferably at least 8 times. In one embodiment, the method further comprises a shaking waveform before step (i). In one embodiment, the method further comprises a driving step to the full color state of the first or second type of particles after the shaking waveform but prior to step (i). It should be noted that the lengths of any of the driving periods referred to in this application may be temperature dependent.

Figure 18:
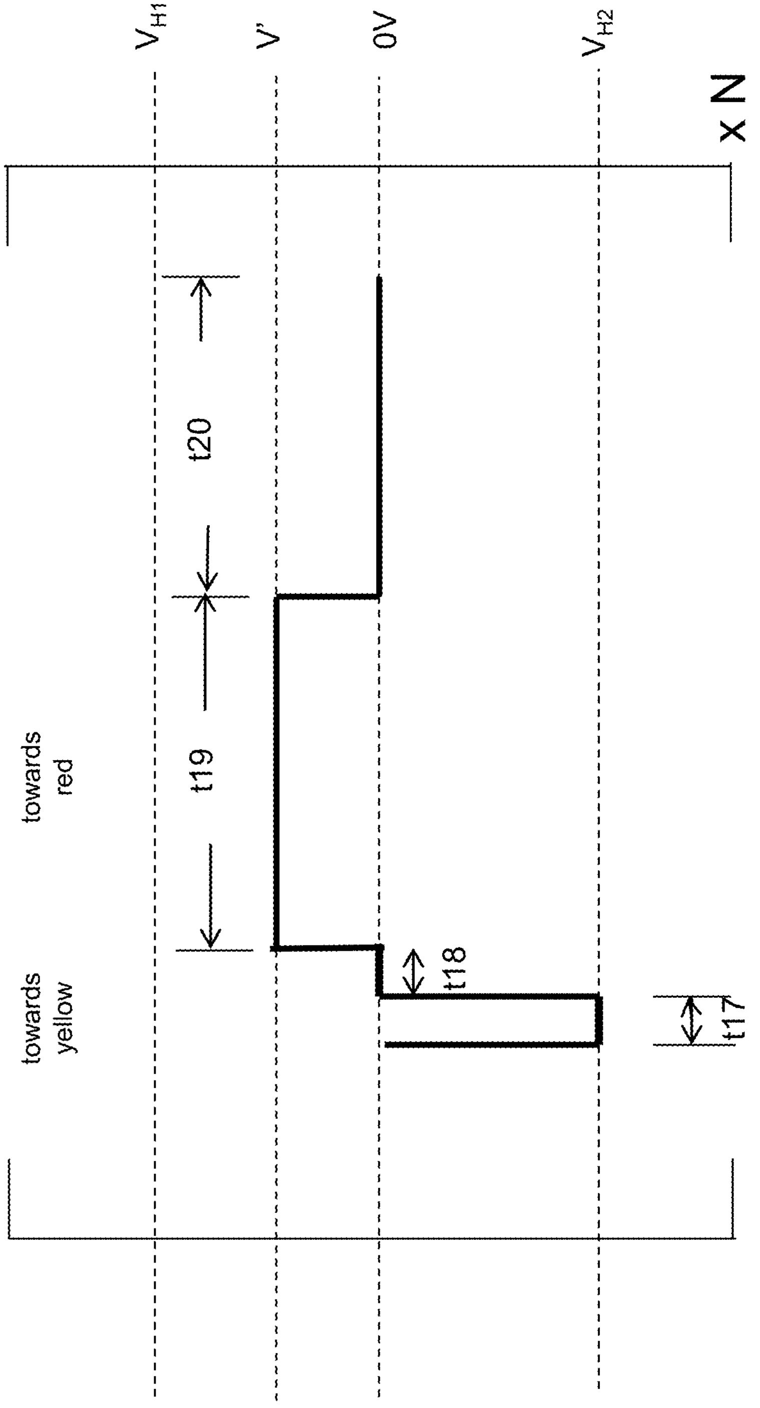
FIGS. 18 and 21 illustrate the fourth driving method of the present invention.
Figure 19:
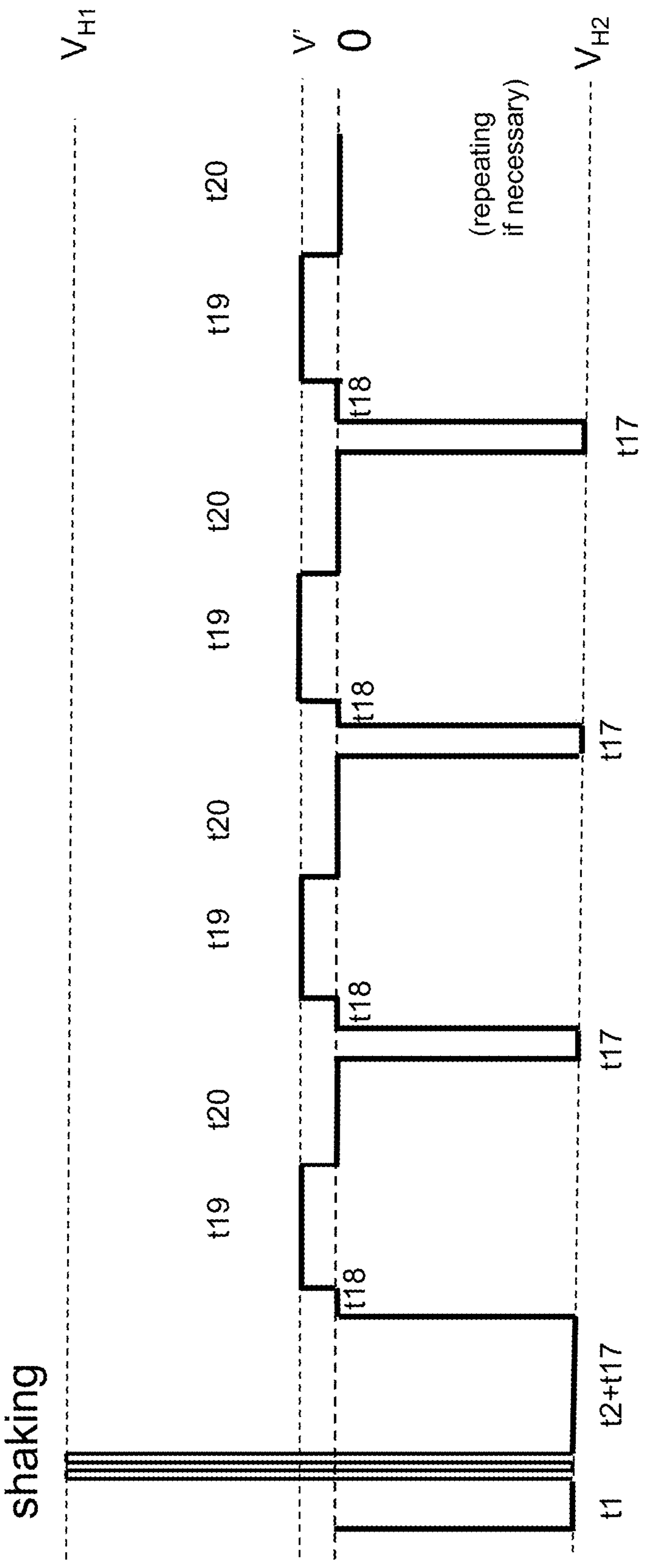
FIGS. 19, 20, 22 and 23 show driving sequences utilizing the fourth driving method of the present invention.
Figure 20:
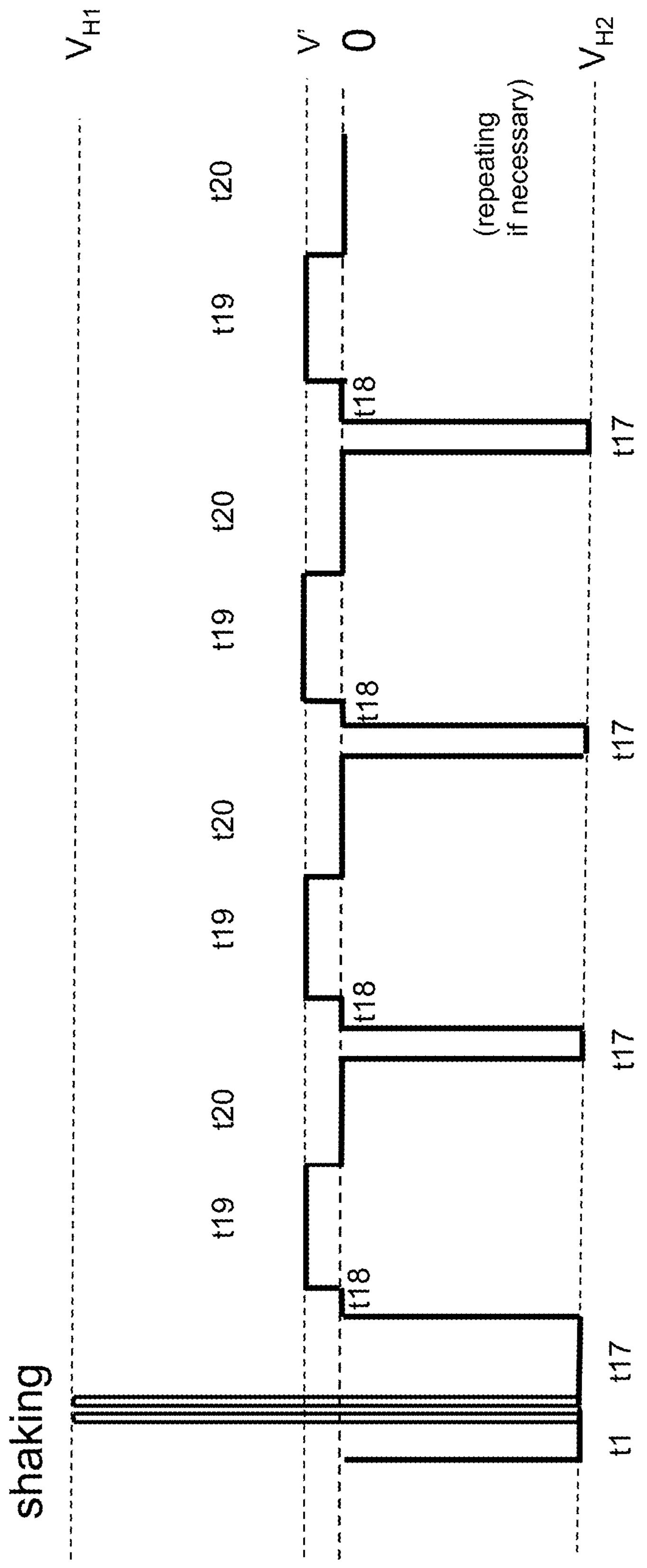

The Fourth Driving Method:

Part A:

The fourth driving method of the present invention is illustrated in FIG. 18. It relates to a driving waveform which may also be used to replace the driving period of t3 in FIG. 4. In an initial step, a high negative driving voltage (VH2, e.g., −15V) is applied to a pixel for a period of t17, which is followed by a wait time of t18. After the wait time, a positive driving voltage (+V', e.g., less than 50% of VH1 or VH2) is applied to the pixel for a period of t19, which is followed by a second wait time of t20. The waveform of FIG. 18 is repeated at least 2 times, preferably at least 4 times and more preferably at least 8 times. The term, "wait time", as described above, refers to a period of time in which no driving voltage is applied. In the waveform of FIG. 18, the first wait time t18 is very short while the second wait time t20 is longer. The period of t17 is also shorter than the period of t19. For example, t17 may be in the range of 20-200 msec; t18 may be less than 100 msec; t19 may be in the range of 100-200 msec; and t20 may be less than 1000 msec. FIG. 19 is a combination of FIG. 4 and FIG. 18. In FIG. 4, a yellow state is displayed during the period of t2. As a general rule, the better the yellow state in this period, the better the red state that will be displayed at the end. In one embodiment, the step of driving to the yellow state for a period of t2 may be eliminated and in this case, a shaking waveform is applied before applying the waveform of FIG. 18 (see FIG. 20). In one embodiment, the entire waveform of FIG. 19 is DC balanced. In another embodiment, the entire waveform of FIG. 20 is DC balanced.

Figure 21:
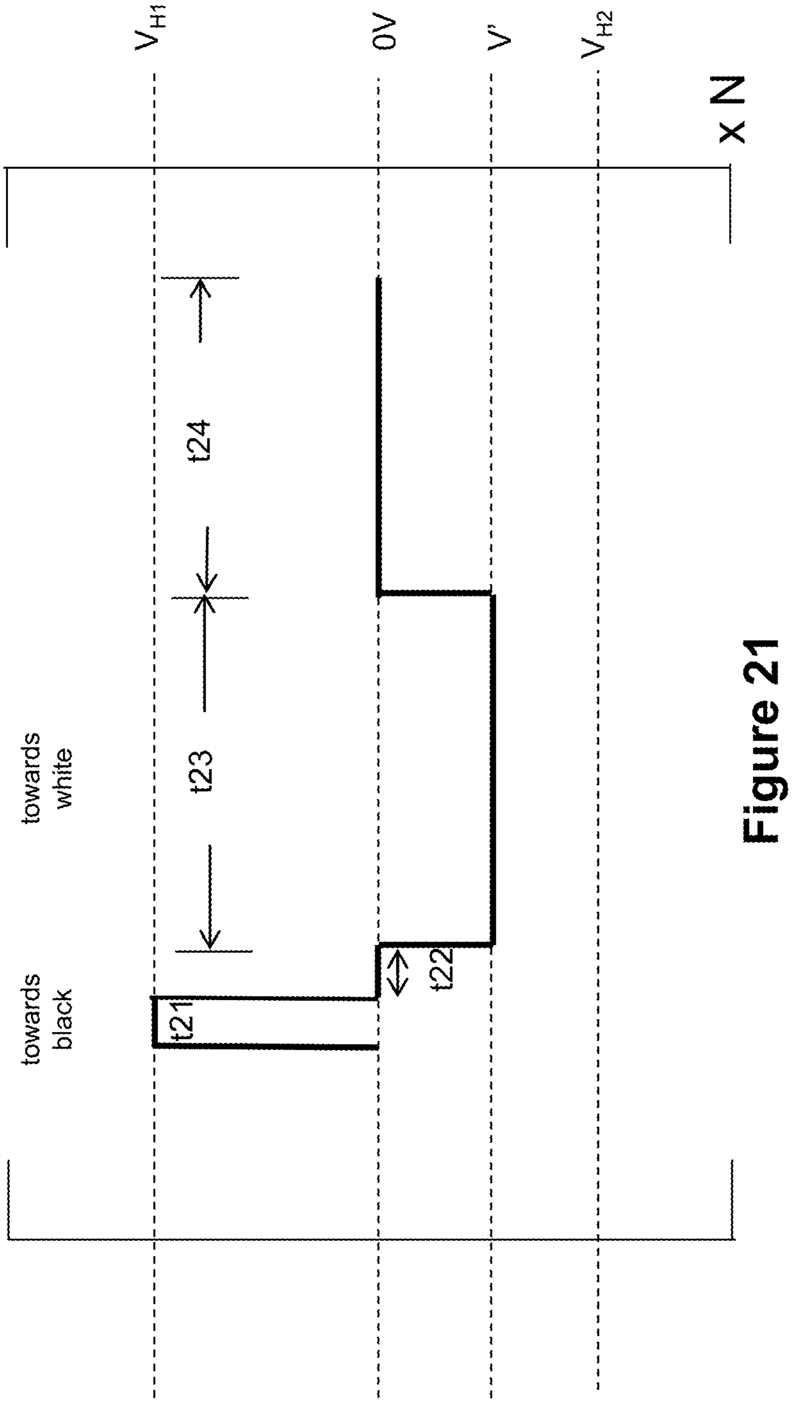
Figure 22:
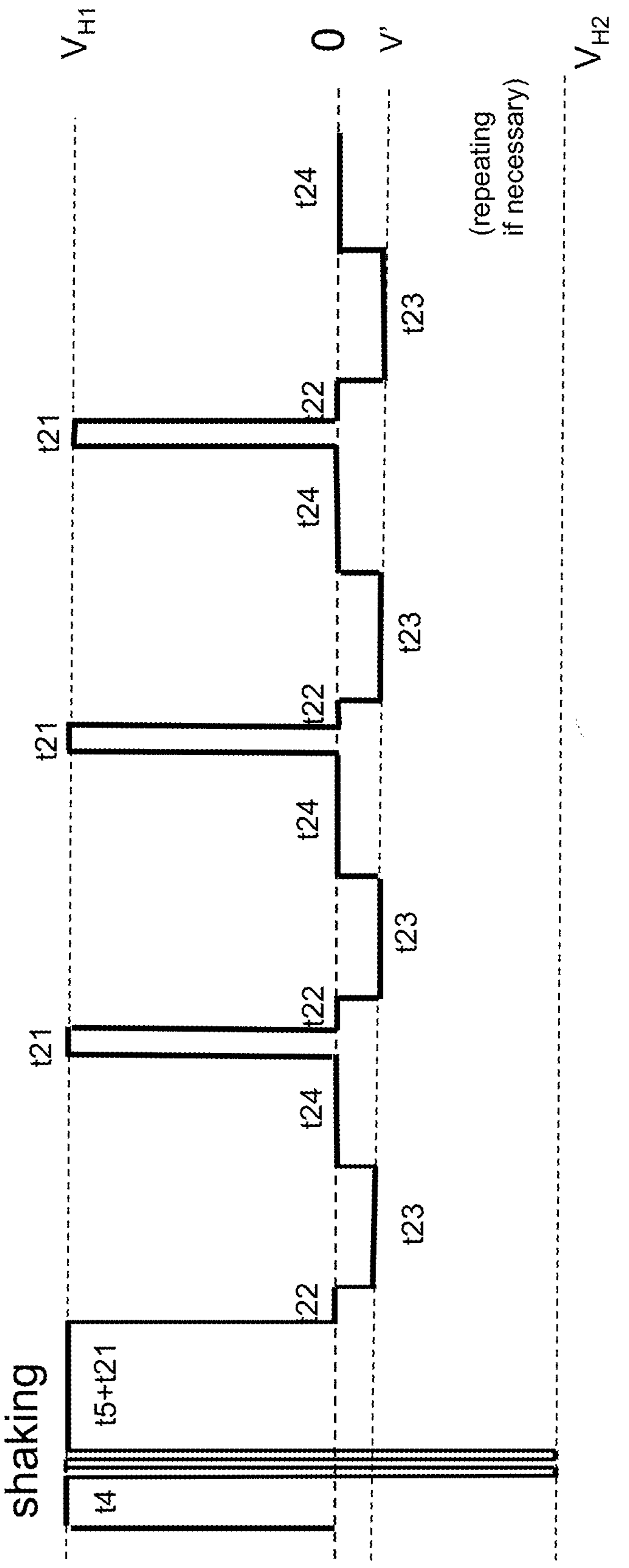
Figure 23:
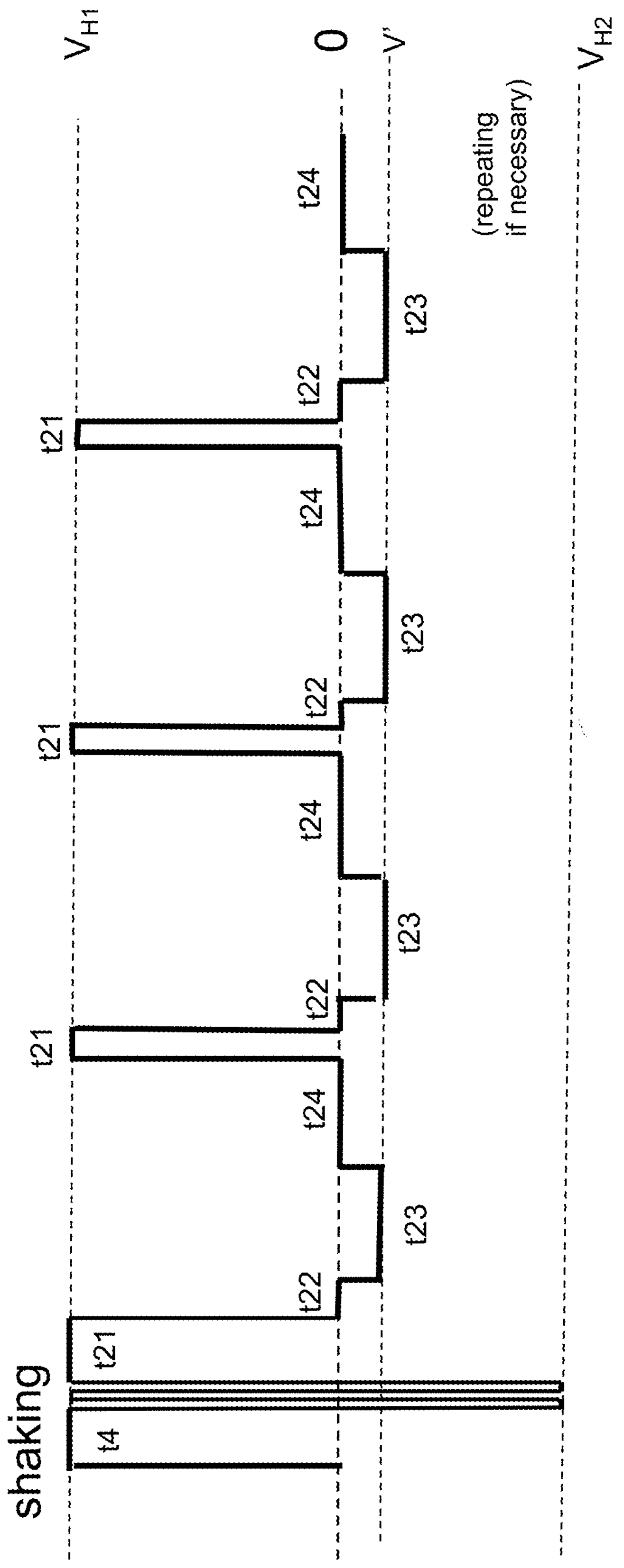

Part B:

FIG. 21 illustrates a driving waveform which may also be used to replace the driving period of t6 in FIG. 5. In an initial step, a high positive driving voltage (VH1, e.g., +15V) is applied to a pixel for a period of t21, which is followed by a wait time of t22. After the wait time, a negative driving voltage (−V', e.g., less than 50% of VH1 or VH2) is applied to the pixel for a period of t23, which is followed by a second wait time of t24. The waveform of FIG. 21 may also be repeated at least 2 times, preferably at least 4 times and more preferably at least 8 times. In the waveform of FIG. 21, the first wait time t22 is very short while the second wait time t24 is longer. The period of t21 is also shorter than the period of t23. For example, t21 may be in the range of 20-200 msec; t22 may be less than 100 msec; t23 may be in the range of 100-200 msec; and t24 may be less than 1000 msec. FIG. 22 is a combination of FIG. 5 and FIG. 21. In FIG. 5, a black state is displayed during the period of t5. As a general rule, the better the black state in this period, the better the white state that will be displayed at the end. In one embodiment, the step of driving to the black state for a period of t5 may be eliminated and in this case, a shaking waveform is applied before applying the waveform of FIG. 21 (see FIG. 23). In one embodiment, the entire waveform of FIG. 22 is DC balanced. In another embodiment, the entire waveform of FIG. 23 is DC balanced.

The fourth driving method, illustrated in FIGS. 18-23, may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first or second type of particles at the viewing side;

(ii) applying no driving voltage to the pixel for a second period of time;

(iii) applying a second driving voltage to the pixel for a third period of time, wherein the third period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particles towards the color state of the third type of particles, at the viewing side;

(iv) applying no driving voltage to the pixel for a fourth period of time; and repeating steps (i)-(iv).

In one embodiment, the amplitude of the second driving voltage is less than 50% of the amplitude of the first driving voltage. In one embodiment, steps (i)-(iv) are repeated at least 2 times, preferably at least 4 times and more preferably at least 8 times. In one embodiment, the method further comprises a shaking waveform before step (i). In one embodiment, the method further comprises driving the pixel to the color state of the first or second type of particles after the shaking waveform but prior to step (i). This driving method not only is particularly effective at a low temperature, it can also provide a display device better tolerance of structural variations caused during manufacture of the display device. Therefore its usefulness is not limited to low temperature driving.

Suffix Pulses for Lesser-Charged Particle States

The various push-pull waveforms in the drive schemes above, can be used to achieve good red and white states, e.g., the lesser-charged particle optical states. In general these waveforms provides high brightness and are robust to the environmental changes, such as temperature variation, and the spectrum of the incident light. However, in some applications, such as digital signage, color variations in the final image are not acceptable to consumers. For example, the white waveform of FIG. 10 may leave a slight yellowish tint in the white state, which consumers find objectionable, especially when the display is adjacent to a light- or white colored bezel.

To some extent, the color of the final state of the lesser-charged particles can be improved by using slightly increasing the magnitude of voltage (V'), e.g., in FIG. 10. In the case of a white state, a greater V' will boost L* and make the final state appear whiter. However, the increase in V' will also increase the amount of yellow that remains, which translates into an increase in b*.

The inventors have found that by adding a series of pulses after the push-pull waveforms, it is possible to address the lesser-charged particles with a lower voltage, V", than the voltage, V', that would achieve the highest L*. These pulses can be thought of as "wait-pull" or "suffix" pulses. The net result is that the combination of the push-pull waveform and the suffix waveform but achieve the higher L* value (in the white state), but without the consummate increase in b*. Because this final state is more "pure" in the lesser-charged particle color, it is typically more pleasing to the consumer.

Figure 24:
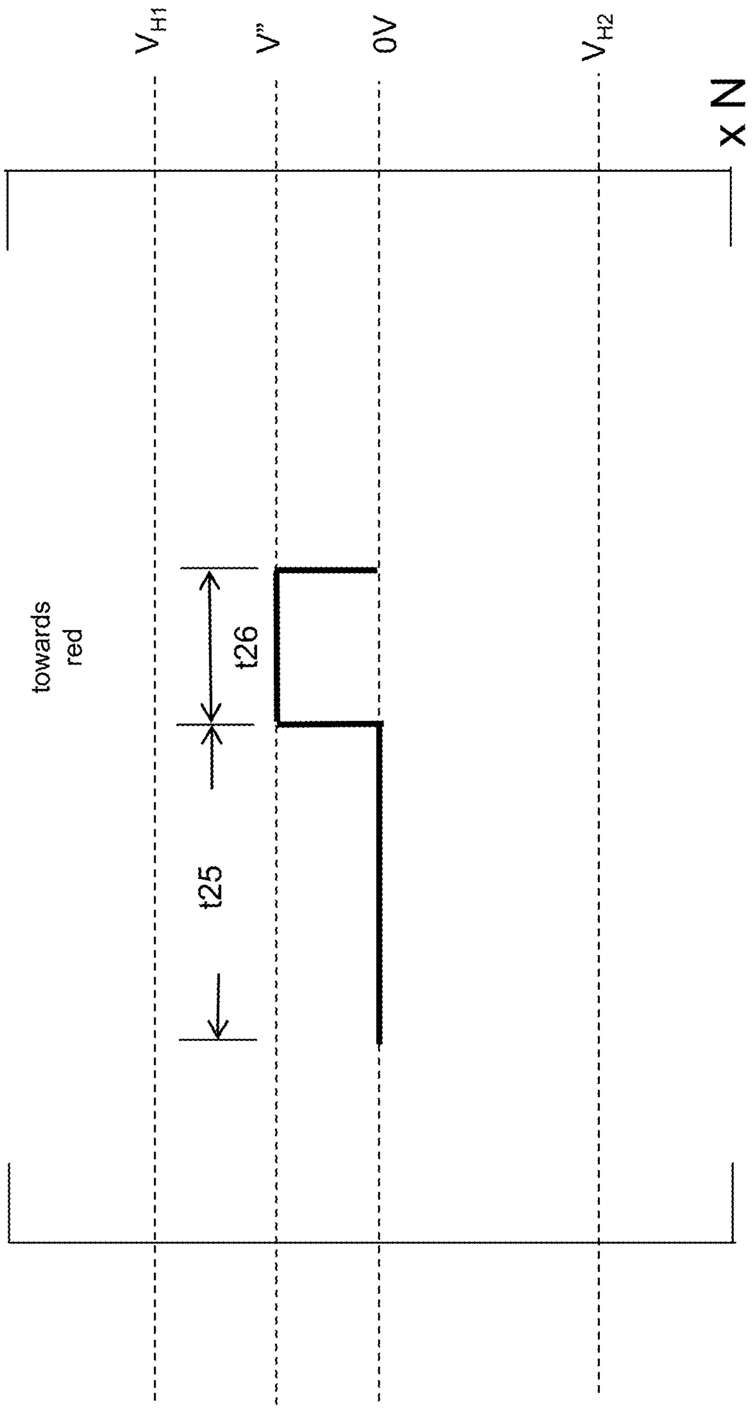
FIG. 24 illustrates an additive waveform that can be used to improve the color state of a lesser-charged particle set.
Figure 28:
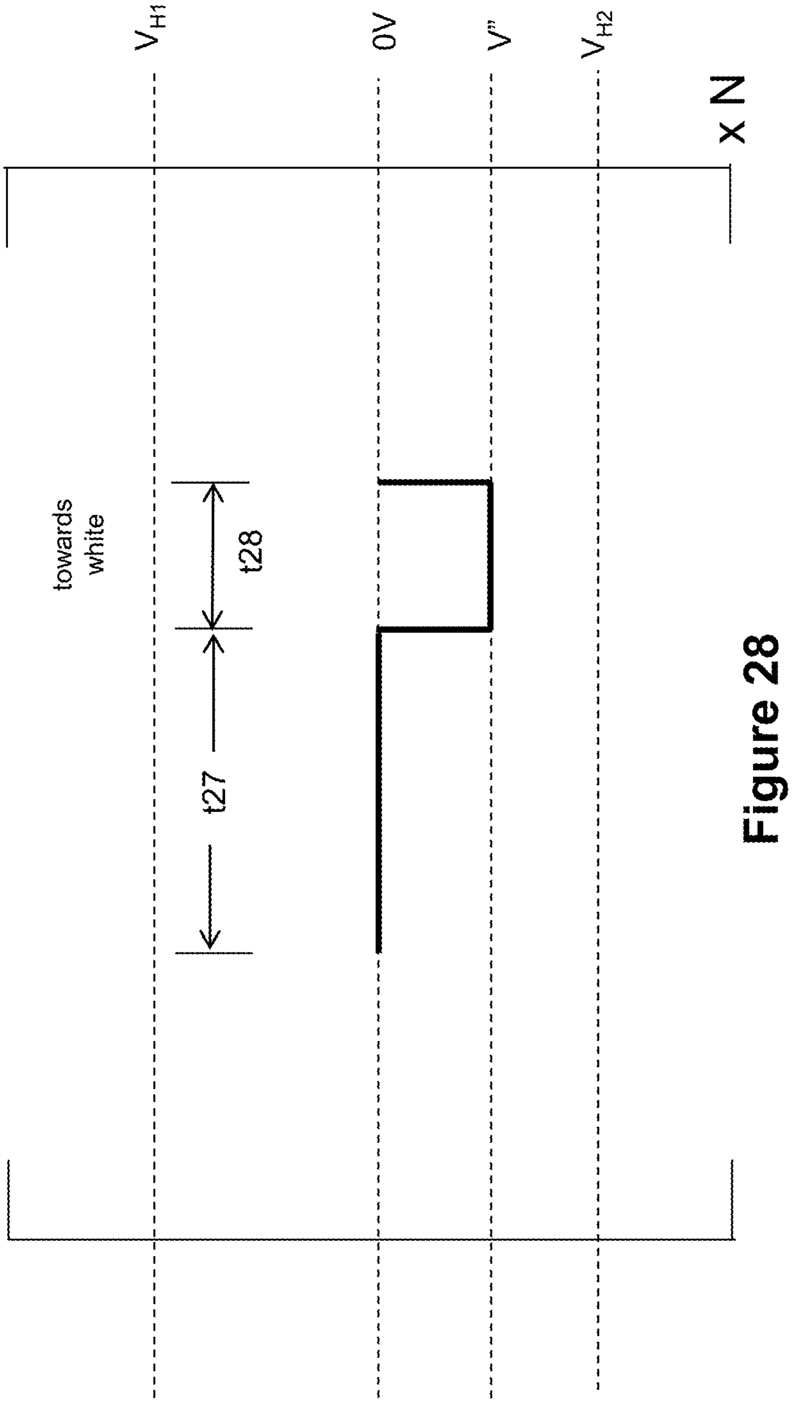
FIG. 28 illustrates an additive waveform that can be used to improve the color state of a lesser-charged particle set.

Specifically, a series of suffix pulses ("wait-pull" pulses), described generally in FIGS. 24 and 28 can be used to improve the final state of the lesser-charged particle states, by providing a lesser-charged color state with less contamination by higher-charged particles. Again, while these lesser-charged particle states are described as red and white, respectively, it is understood that the color state is arbitrary, and the lesser-charged particles could be of any color, e.g., red, orange, yellow, green, blue, violet, brown, black, white, magenta, or cyan. Furthermore, the lesser-charged particles may be reflective, absorptive, scattering, or partially transparent.

A red suffix pulse sequence is illustrated in FIG. 24, and includes a wait period of t25 followed by a drive impulse having a voltage −V' for a period t26, after which the sequence is repeated. The time period of t25 is longer than the time period of t26. The typical range for the wait period t25 is between 20 ms to 5000 ms, while the drive period t26 is between 20 ms to 3000 ms. Such a waveform may be repeated at least 2 times (N'≥2), preferably at least 4 times and more preferably at least 8 times.

The corresponding white suffix pulse sequence is illustrated in FIG. 28, and includes a wait period of t27 followed by a drive impulse having a voltage +V' for a period t28, after which the sequence is repeated. The time period of t27 is longer than the time period of t28. The typical range for the wait period t27 is between 20 ms to 5000 ms, while the drive period t28 is between 20 ms to 3000 ms. Such a waveform may be repeated at least 2 times (N' ≥2), preferably at least 4 times and more preferably at least 8 times. As before, the amplitudes of the driving voltages, −V' and +V" may be 50% of the amplitude of VH (e.g., VH1 or VH2), or less. It is also noted that the amplitude of −V' may be the same as, or different from, the amplitude of +V'.

Figure 25:
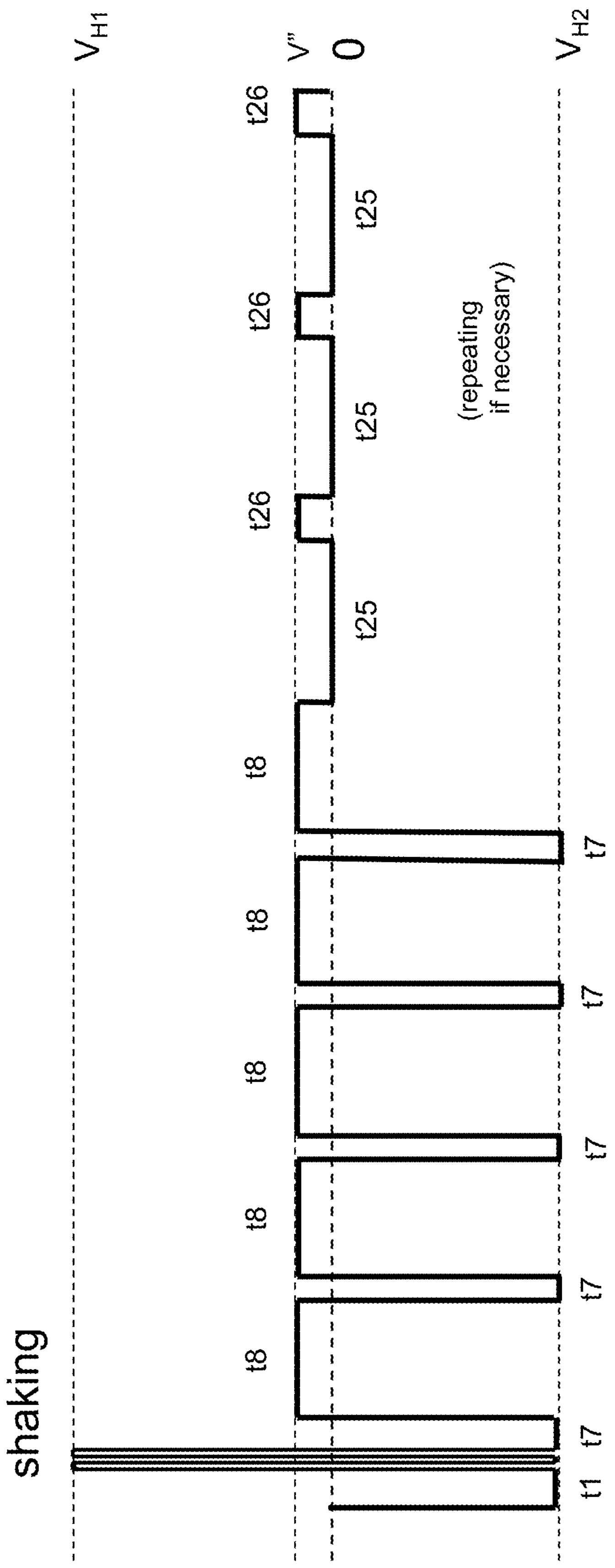
FIG. 25 illustrates a driving method to achieve a high-quality color state of lesser-charged particles.
Figure 26:
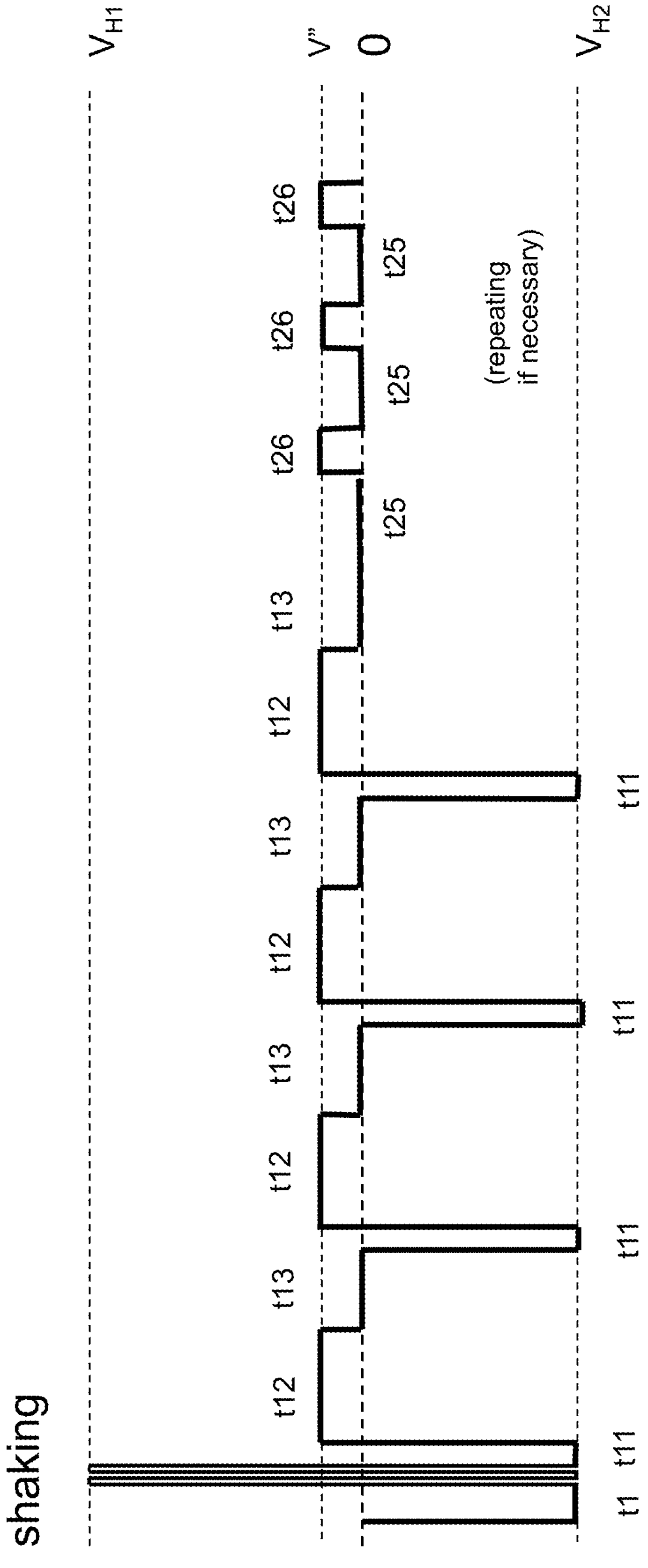
FIG. 26 illustrates a driving method to achieve a high-quality color state of lesser-charged particles.
Figure 27:
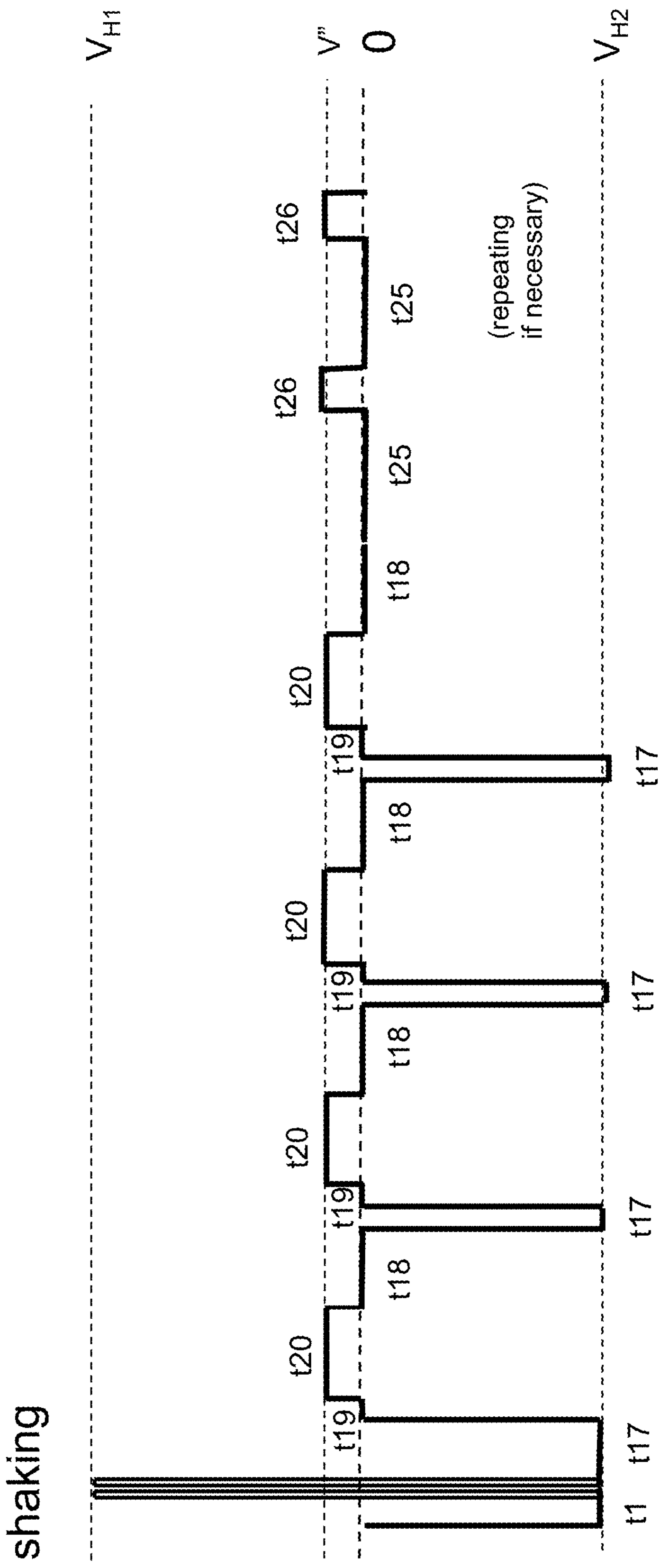
FIG. 27 illustrates a driving method to achieve a high-quality color state of lesser-charged particles.

The suffix pulses are combined with a push-pull waveforms as previously described, e.g., FIGS. 4-23. The resulting red state waveforms are shown in FIGS. 25-27, corresponding to the addition of FIG. 24 to FIGS. 8, 14, and 20, respectively, although the suffix pulse of FIG. 24 could also be added to any of the red state waveforms described herein, including, but not limited to FIGS. 7, 13, and 19. In the same fashion, the white state suffix pulse of FIG. 28 can be added to the white state waveforms of FIGS. 11, 17, and 23, resulting in new white state waveforms of FIGS. 29-31, respectively. Again, the suffix pulse of FIG. 28 could also be added to any of the white state waveforms described herein, including, but not limited to FIGS. 10, 16, and 22. In one embodiment, the waveforms of FIGS. 24 and 28 are DC balanced. In another embodiment, the waveforms of FIGS. 24 and 28 are DC imbalanced, but are coordinated with the preceding waveform, e.g., FIGS. 4-23 such that the entire waveform of FIGS. 25-27 and 29-31 is DC balanced. It should be understood that V' and V" are somewhat arbitrary. Both V' and V" are smaller than VH1 or VH2, typically less than 50% of VH1 or VH2. V" is typically smaller than V', however, V' and V" can be the same, depending upon the final color state (e.g., red versus white) and the ultimate application.

Experimentally, it has been determined that the new waveforms, including a suffix pulse, can drive the final optical state of the lesser-charged particles to a more saturated color state, with less contamination from higher-charged particles. For example, when driving to a white state, the L* of the final state is the same as the push-pull waveform, alone, (indicating the same brightness), but with a smaller b* value than if the waveforms of e.g., FIGS. 11, 17, and 23 were used along. In other words, using the waveforms with the suffix pulses the same white brightness is achieved with less contaminating yellow pigment. The same result was found for the red state achieved with a combination of push-pull and suffix waveforms of FIGS. 25-27. In the instance of a red state, the push-pull/suffix red waveforms resulted in a higher L*, while maintaining the same b* indicating that there was less black pigment in the resulting red state. In both instances, the improvement in the final color state using the improved waveforms, i.e., including the suffix pulses, is visible to the naked eye, as opposed to the waveforms without the suffix pulses, e.g., the push-pull waveforms alone.

Reverse Push Pulse for Improved Particle Separation

While the suffix pulses, described above with respect to FIGS. 24-31 improve the electro-optic characteristics of the smaller charged-particle optical states, it has been observed that the overall electro-optic performance, especially the L* values, is subject to greater drift with small changes in driving voltage when suffix pulses are added to the waveform, e.g., as compared to when the suffix pulses are not included. This is especially evident when observing a white state when the white particles are lesser charged and negative (see FIG. 34, discussed below). While the mechanism responsible for this drift is not entirely clear, it is surmised that some of the particles of the desired lower charge are complexing with particles of the opposite charge. The amount of complexing is highly voltage dependent, so, for example, as more of the white particles complex with the red or black particles, the L* for the white state decreases. The drift can be problematic in instances where the driving voltage for the lower-charged particles must be increased due to changes in the ambient operating environment. For example, in colder conditions, it may be necessary to increase the driving voltage of the lower charge pulses (V' and V"). However, the drift in the optical state may result in unexpected colors when dithering is used to achieve intermediate colors that may be, e.g., a combination of white at one pixel and red at an adjacent pixel.

Figure 32:
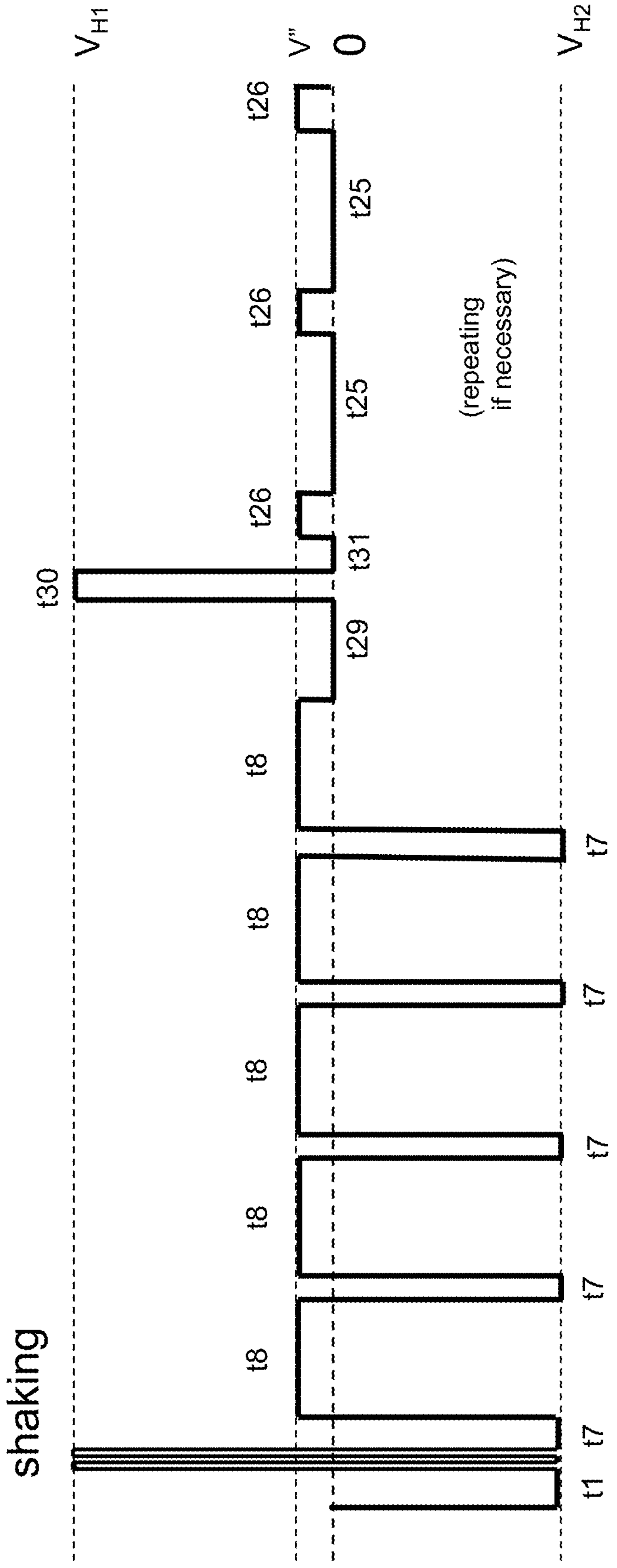
FIG. 32 illustrates an improved driving method to achieve a high-quality color state of lesser-charged particles.

It has been found that the variability in the measured electro-optic state can be improved with the addition of a "reverse push" pulse between the string of addressing push-pull pulses and the suffix pulses. It is surmised, but has not been proven experimentally, that this sharp pulse helps to break up complexes so that the suffix pulses can bring the clean, lower-charged particles to the viewing surface. The pulses are known as reverse push because they have a similar shape but the opposite polarity to the initial push-pull drive pulse. Such a reverse push pulse (e.g., for a red state) is shown in FIG. 32 (width t30, driving voltage VH1), positioned between the last of the addressing push-pull waveform and the beginning of the suffix voltages. The width t30 is typically similar to t7, however it can be longer or shorter. The height of the pulse is the highest driving voltage of the same polarity as the pull pulse, i.e., t8 of FIG.

32. The wait times, t29 and t31 between the last addressing pulse, the reverse push pulse, and the suffix pulses are somewhat arbitrary, and may be adjusted to (for example) coordinate the suffix pulses with other pulse on nearby pixels.

Figure 33:
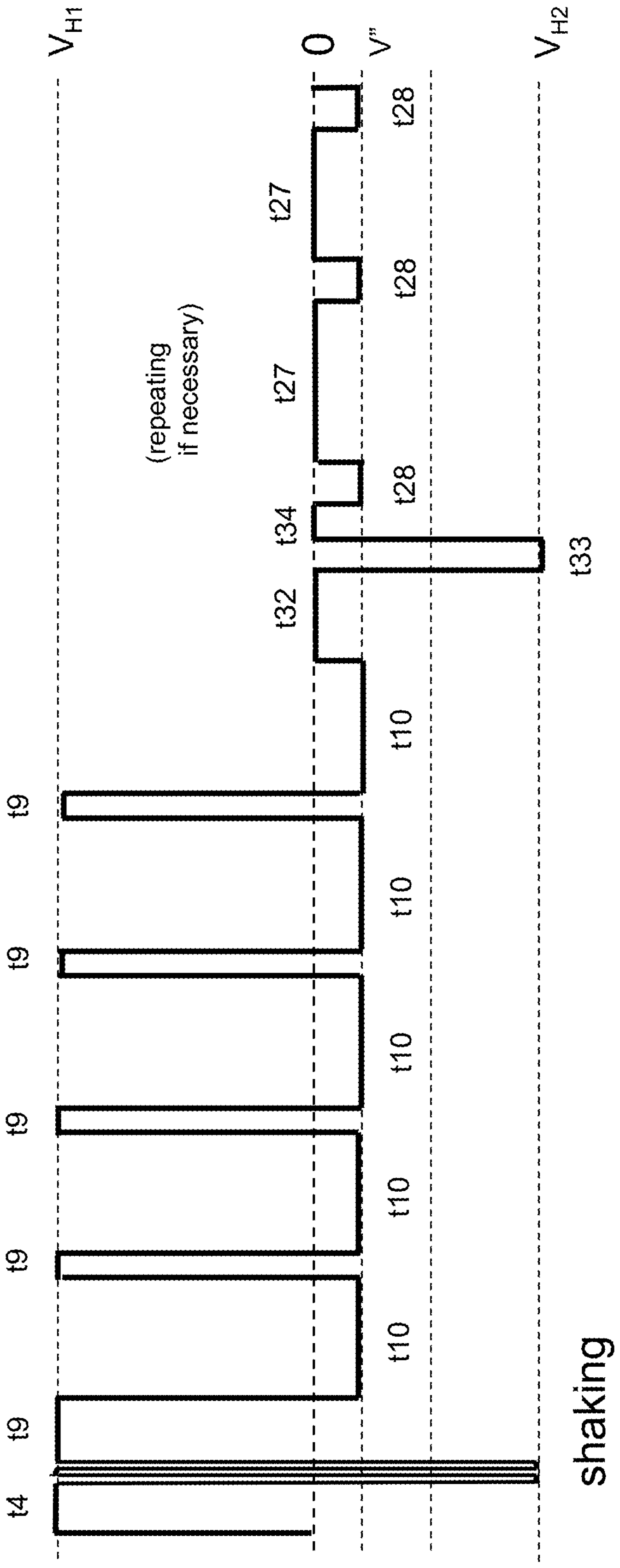
FIG. 33 illustrates an improved driving method to achieve a high-quality color state of lesser-charged particles.

The corresponding reverse push pulse for the other lower-charged particle (e.g., for a white state) is shown in FIG. 33 (width t33, driving voltage VH2). Again, the width t33 is typically similar to t9, however it can be longer or shorter. The height of the pulse is the highest driving voltage of the same polarity as the pull pulse, i.e., t10 of FIG. 33. The wait times, t32 and t34 between the last addressing pulse, the reverse push pulse, and the suffix pulses are somewhat arbitrary.

Example

A four-particle electrophoretic medium of the type described above with respect to FIGS. 2A-2F was prepared and disposed in microcells as described, e.g., in U.S. Pat. No. 6,930,818. The top electrode was a light-transmissive film of ITO-coated PET and the bottom electrode was a simple carbon electrode. The resulting display was attached to a variable voltage driver. Using the waveforms of FIG. 29 and FIG. 33, the change of L* and b* was evaluated using an electro-optic measurement bench including a spectrophotometer. See D. Hertel, "Optical measurement standards for reflective e-paper to predict colors displayed in ambient illumination environments," Color Research & Application, 43, 6, (907-921), (2018). The measurements were all done at room temperature.

Figure 29:
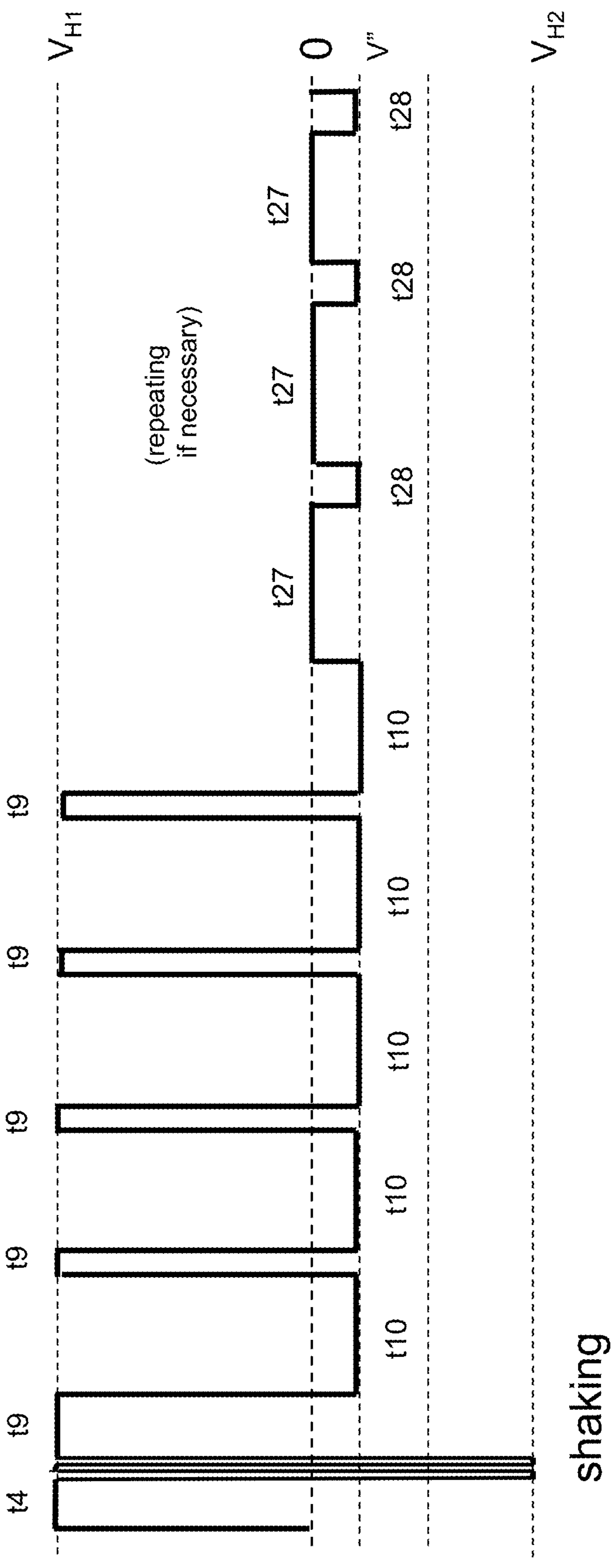
FIG. 29 illustrates a driving method to achieve a high-quality color state of lesser-charged particles.
Figure 30:
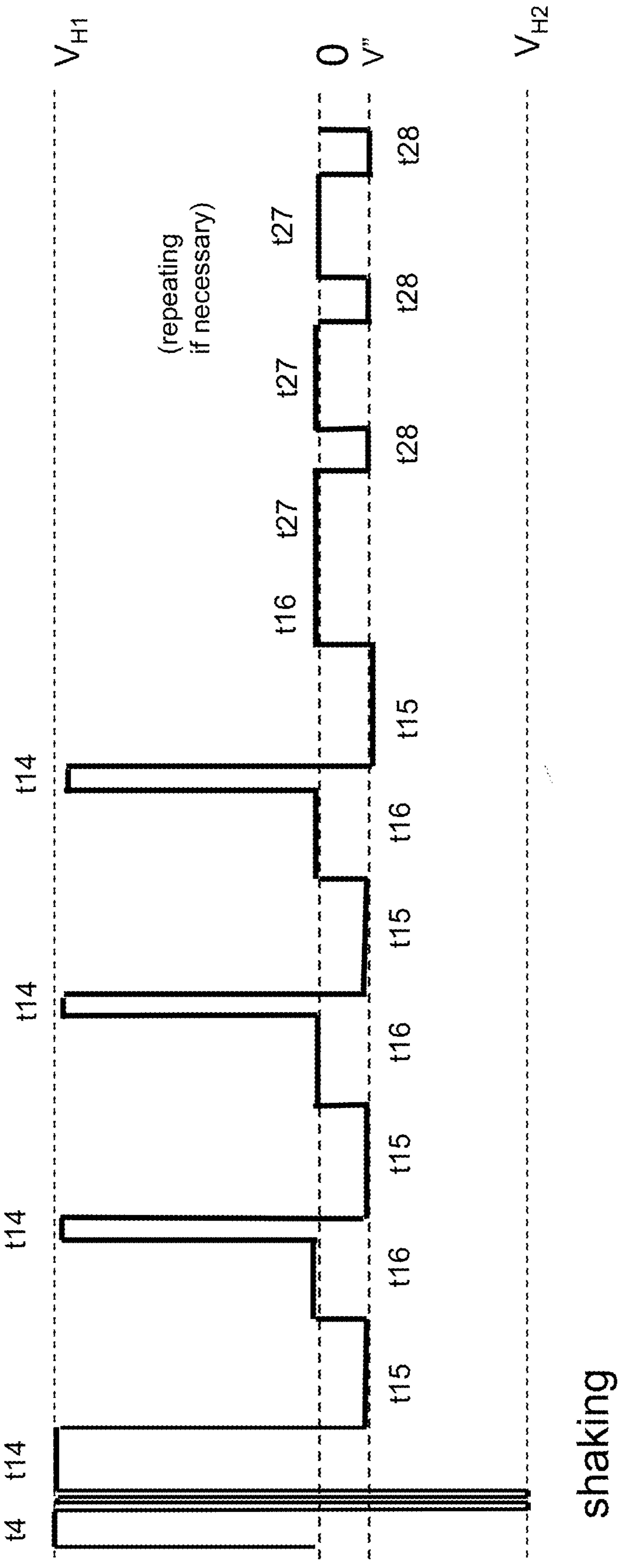
FIG. 30 illustrates a driving method to achieve a high-quality color state of lesser-charged particles.
Figure 31:
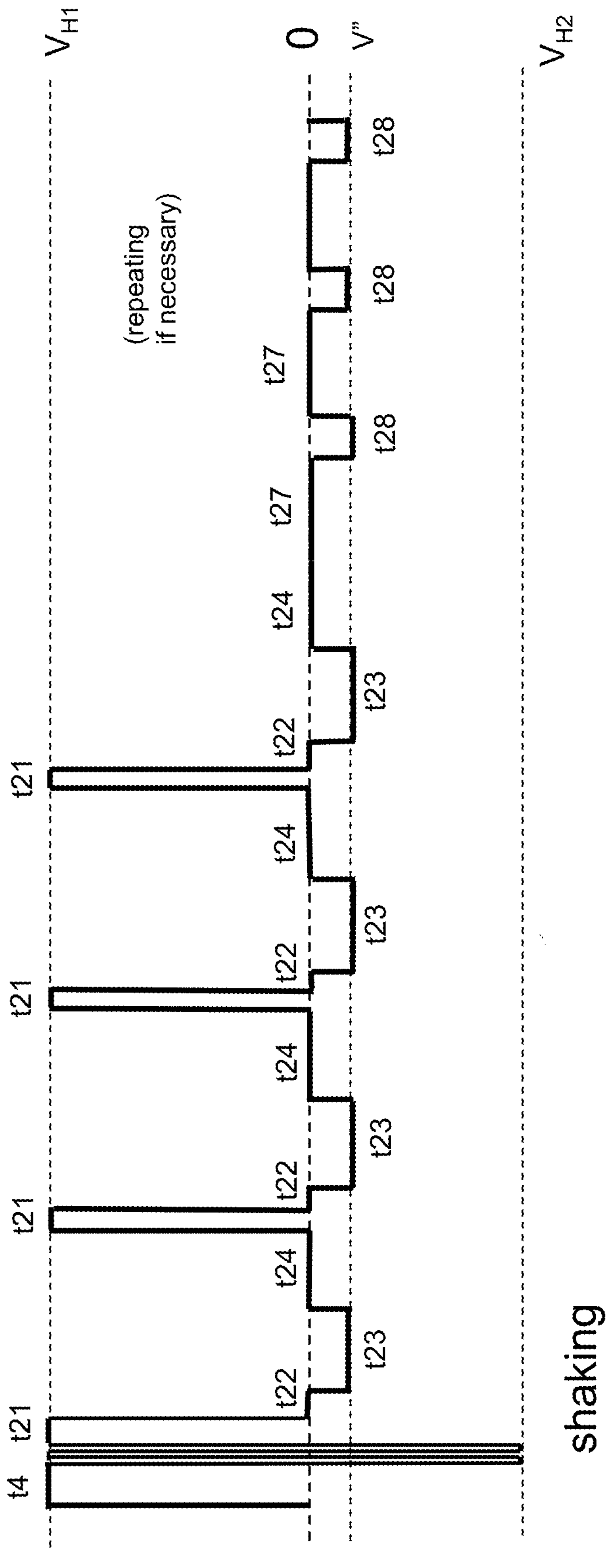
FIG. 31 illustrates a driving method to achieve a high-quality color state of lesser-charged particles.
Figure 34:
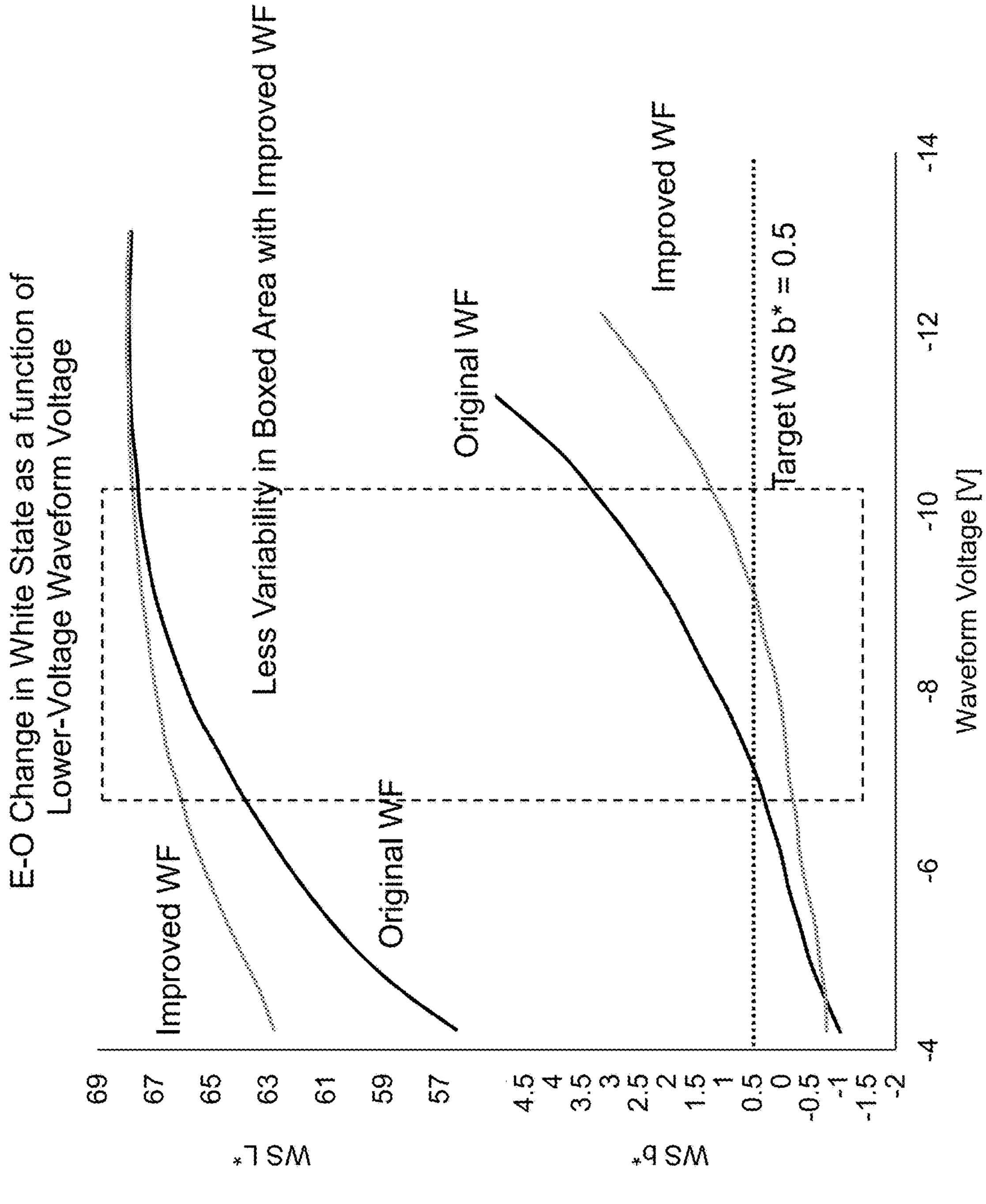
FIG. 34 shows the measured change in electro-optic (EO) performance as a function of the voltage of the lower-voltage waveform. A waveform of FIG. 29 (Original WF) is compared to a waveform of FIG. 33 (Improved WF).

FIG. 34 shows the measurement of the L* and the b* of a white state test pattern on the display as V" ranges from −4V to −13V. As can be seen in FIG. 34, the waveform of FIG. 29 (Original WF—dark line) results in a noticeable variation in the L* and the b* values over the "typical" V" voltage range (as shown by the dashed box). In particular the difference between 64 L* and 67 L* is obvious even to an untrained observer. Notably, the preferred white state has a b* value of approximately 0.5 and the waveform of FIG. 29 is very far from this desired b* outcome at −9.5V.

In contrast, by including a reverse push pulse, as in FIG. 33 (Improved WF—gray line), the variations in L* and b* are noticeably leveled out over the typical operating range (dashed box). In particular, the b* value is in the neighborhood of 0.5 over the full range, and the L* is 66-67, which is much less noticeable to a viewer. Accordingly, the improved waveform of FIG. 33 improves the optical state consistency over the typical voltage range used for the lower voltage pulse.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein (a) the four types of pigment particles have different optical characteristics;

(b) the first type of particles and the third type of particles are positively charged, wherein the first type of particles have a greater magnitude of positive charge than the third particles; and (c) the second type of particles and the fourth type of particles are negatively charged, wherein the second type of particles have a greater magnitude of negative charge than the fourth particles, the method comprises the steps of:

(i) applying a first driving voltage to the pixel of the electrophoretic display for a first period of time (t7, t9) at a first amplitude to drive the pixel to a color state of the first or the second type of particles at the viewing side;

(ii) applying a second driving voltage to the pixel of the electrophoretic display for a second period of time (t8, t10), wherein the second driving voltage has a polarity opposite to that of the first driving voltage and a second amplitude smaller than that of the first amplitude, to drive the pixel from the color state of the first type of particles towards the color state of the fourth type of particles, or from the color state of the second type of particle towards the color state of the third type of particles, at the viewing side, and repeating steps (i)-(ii);

(iii) applying no driving voltage to the pixel for a third period of time (t25, t27);

(iv) applying the second driving voltage to the pixel of the electrophoretic display for a fourth period of time (t26, t28), to drive the pixel from the color state of the first type of particles towards the color state of the fourth type of particles, or from the color state of the second type of particle towards the color state of the third type of particles, at the viewing side, and repeating steps (iii)-(iv), wherein no driving voltage having the same polarity as the first driving voltage is applied between steps (iii) and (iv).

2. The driving method of claim 1, wherein the second period of time in step (ii) is longer than the first period of time in step (i).

3. The driving method of claim 1, wherein steps (i) and (ii) are repeated at least 8 times.

4. The driving method of claim 1, wherein steps (iii) and (iv) are repeated at least 8 times.

5. The driving method of claim 1, wherein the amplitude of the second driving voltage is less than 50% of the amplitude of the first driving voltage.

6. The driving method of claim 1, wherein the magnitude of the positive charge of the third particle is less than 50% of the magnitude of the positive charge of the first particle.

7. The driving method of claim 1, wherein the magnitude of the negative charge of the fourth particle is less than 75% of the magnitude of the negative charge of the second particle.

8. The driving method of claim 1, further comprising applying a voltage with a shaking waveform to the pixel before step (i).

9. The driving method of claim 1, wherein the fourth period of time in step (iv) is shorter than the second period of time in step (ii).

10. The driving method of claim 1, additionally including applying a third driving voltage to the pixel of the electrophoretic display for a fifth period of time (t30, t33) between steps (ii) and (iii), wherein the third driving voltage has the same polarity as the second driving voltage, and the same magnitude as the first amplitude.

11. A driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein (a) the four types of pigment particles have different optical characteristics;

(b) the first type of particles and the third type of particles are positively charged, wherein the first type of particles have a greater magnitude of positive charge than the third particles; and (c) the second type of particles and the fourth type of particles are negatively charged, wherein the second type of particles have a greater magnitude of negative charge than the fourth particles, the method comprises the steps of:

(i) applying a first driving voltage to the pixel of the electrophoretic display for a first period of time (t11, t14) at a first amplitude to drive the pixel to a color state of the first or the second type of particles at the viewing side;

(ii) applying a second driving voltage to the pixel of the electrophoretic display for a second period of time (t12, t15), wherein the second driving voltage has a polarity opposite to that of the first driving voltage and a second amplitude smaller than that of the first amplitude, to drive the pixel from the color state of the first type of particles towards the color state of the fourth type of particles, or from the color state of the second type of particle towards the color state of the third type of particles, at the viewing side;

(iii) applying no driving voltage to the pixel for a third period of time (t13, t16), and repeating steps (i)-(iii);

(iv) applying no driving voltage to the pixel for a fourth period of time (t25, t27);

(v) applying the second driving voltage to the pixel of the electrophoretic display for a fifth period of time (t26, t28), to drive the pixel from the color state of the first type of particles towards the color state of the fourth type of particles, or from the color state of the second type of particle towards the color state of the third type of particles, at the viewing side, and repeating steps (iv)-(v) wherein no driving voltage having the same polarity as the first driving voltage is applied between steps (iv) and (v).

12. The driving method of claim 11, wherein the second period of time in step (ii) is longer than the first period of time in step (i).

13. The driving method of claim 11, wherein steps (i)-(iii) are repeated at least 8 times.

14. The driving method of claim 11, wherein steps (iv) and (v) are repeated at least 8 times.

15. The driving method of claim 11, wherein the amplitude of the second driving voltage is less than 50% of the amplitude of the first driving voltage.

16. The driving method of claim 11, wherein the magnitude of the positive charge of the third particle is less than 50% of the magnitude of the positive charge of the first particle.

17. The driving method of claim 11, wherein the magnitude of the negative charge of the fourth particle is less than 75% of the magnitude of the negative charge of the second particle.

18. The driving method of claim 11, further comprising applying a voltage with a shaking waveform to the pixel before step (i).

19. The driving method of claim 11, wherein the fifth period of time in step (v) is shorter than the second period of time in step (ii).

* * * * *